US012661994B2

(12) United States Patent
Rundus et al.

(10) Patent No.: US 12,661,994 B2
(45) Date of Patent: Jun. 23, 2026

(54) USING 'DYNAMIC REGENERATIVE BRAKING' TO ENHANCE CRASH AVOIDANCE

(71) Applicant: University of Iowa Research Foundation, Iowa City, IA (US)

(72) Inventors: Christopher R. M. Rundus, Iowa City, IA (US); Daniel V. McGehee, Iowa City, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 70 days.

(21) Appl. No.: 18/853,995

(22) PCT Filed: Mar. 30, 2023

(86) PCT No.: PCT/US2023/016988

§ 371 (c)(1),
(2) Date: Oct. 3, 2024

(87) PCT Pub. No.: WO2023/196164

PCT Pub. Date: Oct. 12, 2023

(65) Prior Publication Data

US 2025/0222778 A1 Jul. 10, 2025

Related U.S. Application Data

(60) Provisional application No. 63/326,988, filed on Apr. 4, 2022.

(51) Int. Cl.
B60L 7/18 (2006.01)
B60L 15/20 (2006.01)
(52) U.S. Cl.
CPC ............. B60L 7/18 (2013.01); B60L 15/2009 (2013.01); B60L 2250/26 (2013.01)

(58) Field of Classification Search
CPC ..... B60L 7/18; B60L 15/2009; B60L 2250/26
See application file for complete search history.

(56) References Cited

U.S. PATENT DOCUMENTS 9,499,141 B1 * 11/2016 Elkenkamp ............. B60T 8/171
9,707,848 B2 7/2017 Huh
(Continued)

OTHER PUBLICATIONS

C. Mitropoulos-Rundus, C. Schwarz, and D. McGehee, "Benefits Estimation of Regenerative Braking versus Service Braking," Ergonomics, vol. 64, No. 9, pp. 1217-1227, 2021.
(Continued)

*Primary Examiner* — Hussein Elchanti
(74) *Attorney, Agent, or Firm* — Goodhue, Coleman & Owens, P.C.

(57) ABSTRACT

A method for dynamic regenerative braking of a vehicle includes sensing one or more parameters associated with a driving environment of the vehicle, the one or more parameters including parameters determined using a vision system of the vehicle position to capture the driving environment in a forward direction. The method further includes adjusting by an electronic device a dynamic regenerative braking level prior to initiation of braking in response to the one or more parameters. The method further includes resetting the dynamic regenerative braking level by the electronic device when the vehicle operator applies pressure to an accelerator interface. The accelerator interface may include an accelerator pedal. The method may further include applying regenerative braking at the dynamic regenerative braking level and prior to resetting the dynamic regenerative braking level by the electronic device.

21 Claims, 22 Drawing Sheets

(56) References Cited

U.S. PATENT DOCUMENTS

| | | | |
|---|---|---|---|
| 2009/0227418 A1 | 9/2009 | Farnsworth | |
| 2012/0325573 A1 | 12/2012 | Miller | |
| 2013/0090822 A1 | 4/2013 | Schwindt | |
| 2015/0019058 A1 | 1/2015 | Georgiev | |
| 2016/0001659 A1 | 1/2016 | Huh et al. | |
| 2016/0052495 A1* | 2/2016 | Nakaso | B60L 15/2009 |
| | | | 701/70 |
| 2016/0167519 A1* | 6/2016 | Luke | B60L 58/12 |
| | | | 701/22 |
| 2017/0015314 A1* | 1/2017 | Tanase | B60W 30/09 |
| 2017/0066331 A1 | 3/2017 | Jeon et al. | |
| 2019/0061763 A1* | 2/2019 | Takeda | B60W 10/18 |
| 2020/0130686 A1 | 4/2020 | Kim | |
| 2020/0353930 A1 | 11/2020 | Lee | |
| 2022/0105925 A1* | 4/2022 | Naserian | B60W 10/184 |
| 2022/0161796 A1* | 5/2022 | Ookawara | B60W 30/18072 |

OTHER PUBLICATIONS

F. Sugimoto et al., "Effects of one-pedal automobile operation on the driver's emotional state and cognitive workload," Appl. Ergon., vol. 88, pp. 103179-103179, 2020.

G. K. Poock, A. E. West, T. J. Toben, and J. P. T. Sullivan, "A Combined Accelerator-Brake Pedal," Ergonomics, vol. 16, No. 6, pp. 845-848, 1973.

M. M. Minderhoud and P. H. L. Bovy, "Extended time-to-collision measures for road traffic safety assessment," Accid. Anal. Prev., vol. 33, No. 1, pp. 89-97, Jan. 2001, doi: 10.1016/S0001-4575(00)00019-1.

M. Massot Campos, D. Montesinos i Miracle, J. Bergas Jane, and A. Rufer, "Multilevel modular DC/DC converter for regenerative braking using supercapacitors," Journal of Energy and Power Engineering 6 (2012) 1131-1137.

P. Cocron, F. Buhler, T. Franke, I. Neumann, B. Dielmann, and J. F. Krems, "Energy recapture through deceleration—regenerative braking in electric vehicles from a user perspective," Ergonomics, vol. 56, No. 8, pp. 1203-1215, Aug. 2013, doi: 10.1080/00140139.2013.803160.

S. Konz, N. Wadhera, S. Sathaye, and S. Chawla, "Human Factors Considerations for a Combined Brake-Accelerator Pedal," Ergonomics, vol. 14, No. 2, pp. 279-292, 1971, doi: 10.1080/00140137108931245.

S. Y. Chang Zi-ting, "Vehicle Speed Measurement Method Based on Binocular Vision," Ji Suan Ji Ke Xue, vol. 48, No. 9, pp. 135-139, 2021, doi: 10.11896/jsjkx.201000047.

X. Hou, J. Zhang, Z. Zhang, and he Chengkun, "Analysis of Active Collision Avoidance Performance Based on Cooperative Regenerative Auxiliary Braking System," Nov. 2019. doi: 10.4271/2019-01-5027, 21 pages.

A. Mukhtar, L. Xia, and T. B. Tang, "Vehicle Detection Techniques for Collision Avoidance Systems: A Review," IEEE Trans. Intell. Transp. Syst., vol. 16, No. 5, pp. 2318-2338, Oct. 2015, doi: 10.1109/TITS.2015.2409109.

D. Biswas, H. Su, C. Wang, and A. Stevanovic, "Speed estimation of multiple moving objects from a moving UAV platform," ISPRS Int. J. Geo-Inf., vol. 8, No. 6, pp. 259-, 2019, doi: 10.3390/ijgi8060259.

G. Xu, W. Li, K. Xu, and Z. Song, "An intelligent regenerative braking strategy for electric vehicles," Energies, vol. 4, No. 9, pp. 1461-1477, 2011, doi: 10.3390/en4091461.

Guo et al. "Safe and energy-efficient car-following control strategy for intelligent electric 1-19 vehicles considering regenerative braking." IEEE Transactions on Intelligent Transportation Systems 23.7 (2021 ): 7070-7081. Retrieved on May 12, 2023 (May 12, 2023) from entire document.

International Search Report and the Written Opinion, PCT/US2023/016988. Jun. 30, 2023, 14 Pages.

K. T. Chau, "21—Pure electric vehicles," in Alternative Fuels and Advanced Vehicle Technologies for Improved Environmental Performance, R. Folkson, Ed. Woodhead Publishing, 2014, pp. 655-684. doi: 10.1533/9780857097422.3.655.

K. V. Sakhare, T. Tewari, and V. Vyas, "Review of Vehicle Detection Systems in Advanced Driver Assistant Systems," Arch. Comput. Methods Eng., vol. 27, No. 2, pp. 591-610, Apr. 2020, doi: 10.1007/s11831-019-09321-3.

L. Yang, M. Li, X. Song, Z. Xiong, C. Hou, and B. Qu, "Vehicle Speed Measurement Based on Binocular Stereovision System," IEEE Access, vol. 7, pp. 106628-106641, 2019, doi: 10.1109/ACCESS.2019.2932120.

T. Inagaki and M. Itoh, "Human's Overtrust in and Overreliance on Advanced Driver Assistance Systems: A Theoretical Framework," Int. J. Veh. Technol., vol. 2013, pp. 1-8, 2013, doi: 10.1155/2013/951762.

W. Czajewski and M. Iwanowski, "Vision-Based Vehicle Speed Measurement Method," Sep. 2010, vol. 6374, pp. 308-315. doi: 10.1007/978-3-642-15910-7_35.

Z. Gao, T. Sun, M. Hassan, and L. Wang, "Design of vehicle automatic braking systems considering drivers' braking characteristics," Int. J. Perform. Eng., vol. 15, No. 9, pp. 2338-2345, 2019, doi: 10.23940/ijpe.19.09.p6.23382345.

* cited by examiner

Accelerator Release to Brake Press Time

| DRB Level | 0.1 | 0.2 | 0.3 | 0.4 | 0.5 | 0.6 | 0.7 | 0.8 | 0.9 | 1 | 1.1 | 1.2 | 1.3 | 1.4 |
|---|---|---|---|---|---|---|---|---|---|---|---|---|---|---|
| 6 | -0.003 | -0.366 | -1.697 | -2.361 | -2.76 | -3.024 | -3.213 | -3.354 | -3.462 | -3.547 | -3.617 | -3.673 | -3.721 | -3.765 |
| 5 | -0.003 | -0.333 | -1.546 | -2.153 | -2.518 | -2.762 | -2.936 | -3.066 | -3.166 | -3.245 | -3.308 | -3.359 | -3.401 | -3.437 |
| 4 | -0.003 | -0.279 | -1.29 | -1.769 | -2.1 | -2.304 | -2.449 | -2.558 | -2.643 | -2.71 | -2.763 | -2.806 | -2.843 | -2.873 |
| 3 | -0.003 | -0.224 | -1.034 | -1.439 | -1.683 | -1.846 | -1.962 | -2.05 | -2.188 | -2.173 | -2.217 | -2.253 | -2.282 | -2.307 |
| 2 | -0.003 | -0.166 | -0.766 | -1.065 | -1.246 | -1.366 | -1.452 | -1.517 | -1.567 | -1.607 | -1.641 | -1.668 | -1.692 | -1.711 |
| 1 | -0.003 | -0.088 | -0.4 | -0.555 | -0.648 | -0.71 | -0.754 | -0.787 | -0.813 | -0.833 | -0.85 | -0.864 | -0.875 | -0.885 |
| 0 | -0.003 | -0.018 | -0.074 | -0.103 | -0.119 | -0.131 | -0.139 | -0.144 | -0.149 | -0.153 | -0.156 | -0.158 | -0.16 | -0.162 |

FIG. 13

START

SENSE ONE OR MORE PARAMETERS ASSOCIATED WITH A
DRIVING ENVIRONMENT OF THE VEHICLE

202

ADJUST BY AN ELECTRONIC DEVICE A DYNAMIC
REGENERATIVE BRAKING LEVEL PRIOR TO INITIATION OF
BRAKING IN RESPONSE TO THE ONE OR MORE
PARAMETERS

204

RESET THE DYNAMIC REGENERATIVE BRAKING LEVEL BY
THE ELECTRONIC DEVICE

206

USING 'DYNAMIC REGENERATIVE BRAKING' TO ENHANCE CRASH AVOIDANCE

RELATED APPLICATIONS

This application claims priority to U.S. Provisional Patent Application No. 63/326,988, filed Apr. 4, 2022, hereby incorporated by reference in its entirety.

FIELD OF THE INVENTION

The present invention relates to regenerative braking in vehicles. More particularly, but not exclusively, the present invention relates to using regenerative braking to enhance crash avoidance.

BACKGROUND OF THE ART

The background of the art is discussed with respect to two aspects, namely regenerative braking and vehicle safety. The relationship between the two would not be apparent to one skilled in the art absent the benefit of this disclosure.

In a vehicle with an internal combustion engine (ICE), service brakes (SB) squeeze the rotors, and friction is created and used to slow the vehicle. Vehicles powered by electricity and some hybrids, utilize regenerative braking to recapture the kinetic energy that would normally be lost while braking as unused heat. Regenerative braking (RB) is a system that does not use the service brakes of the vehicle. RB is not necessarily designed to rapidly slow vehicles. Therefore, electric vehicles equipped with RB, are also equipped with SB. RB works by reversing the rotation of the motor, allowing torque created from the deceleration to slow the vehicle while generating electricity. The motor can act as an electric generator when running backwards and feed the energy collection from the slowing vehicle back into the vehicle's batteries [1]. RB has the potential to save from 8% to as much as 25% of the total energy use of the vehicle [1]. FIG. 1 illustrates one example of such a system.

How RB is triggered has some variance depending on the vehicle model. The system can be triggered via accelerator pedal or brake pedal or both pedals depending on the system [2]. In the case of Tesla vehicles, the RB system is triggered as soon as positive pressure starts to be released from the accelerator pedal. FIG. 2 is a state diagram which explains when RB is and is not active in electric vehicles. For the diagram, 'X' is defined as the point that the driver's foot is still pressed on the accelerator pedal and RB is triggered.

The amount of deceleration RB provides varies from vehicle model to vehicle model. In the case of the Tesla Model S75D, there are two levels of RB that are offered. These levels of RB were measured and modeled from data collected from specially instrumented Tesla Model S75D research vehicle. The low level of RB slowed the car at approximately 0.02 to 0.05 g, while the high level slowed the vehicle at approximately 0.15 to 0.2 g (Mitropoulos-Rundus et al., 2021). In order to quantify this, these levels of deceleration were measured with repeated trials of on-road testing in a specially instrumented Tesla research vehicle (Mitropoulos-Rundus et al., 2021). The range exists because the deceleration of the vehicle cannot immediately go from 0 g to the level of deceleration imparted by RB because the deceleration graph is continuous. When the RB torque alone, is insufficient to offer the same deceleration rate as SB, hydraulic braking torque is applied in addition to RB [4]. When a vehicle uses RB which provides little braking torque (a low level of RB), then a significant portion of braking must be supplemented with conventional SB and is therefore less efficient. Conversely, a vehicle using RB which provides a significant amount of braking torque (a high level of RB), would require less SB supplementation and is therefore more efficient. Previous research found that drivers using RB, are able to properly gauge the advantage that RB provides, and alter the amount of pressure applied to the brake and so they can brake at the rate required to avoid a collision (Mitropoulos-Rundus et al., 2021).

A. Advanced Driver Assistance Systems

Advanced driver assistance systems (ADAS) support drivers in a dynamic environment [5]. The functions include (a) perception enhancement, (b) arousing attention of the driver, (c) setting off a warning to encourage the driver to take a specific action, and (d) automatic safety control when the driver takes no action [5]. Functions (a)-(c) do not take any control away from the driver, while function (d) intervenes on behalf of the driver. Most critically, ADAS systems use SB/RB in modulating positive and negative acceleration. It is this interface that makes such systems perform better when there more responsive and nuanced deceleration.

B. Detection and Warning Systems

Vehicle detection and warning systems are what provide the necessary information to ADAS systems. They provide these systems with information about objects external to the vehicle, in order to aid in crash avoidance. Vehicle detection systems have been achieved first by using active sensors such as computer vision, LiDAR and Radar [6]. These systems can calculate the distance between the driver vehicle and another vehicle as well as the relative speeds by observing echoes of Radar signals, or the doppler effect [7]. Vision based detection using cameras is another method that is used. The detailing information that cameras provide (color, texture, shape, etc.) has made them the choice of researchers for driver detection systems [6]. In addition to the detailing information, vision based systems also provide low power operability and low cost [6].

C. Automatic Emergency Braking

The most common form of automated service braking that exists in vehicles today is automatic emergency braking. Automatic Emergency Braking (AEB) is a crash avoidance system which detects an impending forward collision with another vehicle. AEB is always active, even when other ADAS systems such as ACC are active. AEB generally operates best at speeds less than 25 mph. The system first alerts the driver to take corrective action by braking, and if the driver's response is not sufficient, the AEB system automatically applies the brakes at the maximum level. Thus, AEB completely takes over the braking if the driver does not take any action in avoiding a forward collision, making it a form of automation. FIG. 3 shows a model of when AEB is triggered versus brake assist or no assistance. The key variables determining whether AEB will be triggered are the level of danger and whether there is a driver response. AEB relies on detection and warning systems such as LiDAR, radar, and/or computer-based vision to determine the level of danger.

D. Regenerative Braking in the Context of Crash Avoidance

A vehicle with a modern automatic transmission and SB largely coasts when the brake pedal is released, and pedal deflection is zero. With RB, when pedal deflection falls below the activation threshold, the vehicle begins actively decelerating. The coasting period in a vehicle equipped with SB is valuable time that could be leveraged with RB in an emergency braking scenario.

Therefore, what is needed are methods, systems, and apparatus for leveraging regenerative braking in emergency braking scenarios.

SUMMARY

Therefore, it is a primary object, feature, or advantage to improve over the state of the art.

It is a further object, feature, or advantage to leverage regenerative braking in emergency braking scenarios.

A still further object, feature, or advantage is to use regenerative braking in a manner to assist with crash avoidance.

Another object, feature, or advantage is to provide methods for leveraging regenerative braking which eliminate or reduce the need for additional hardware in order to provide the benefits.

One or more of these and/or other objects, features, or advantages will become apparent from the specification and claims that follow. No single embodiment need achieve each and every object, feature, or advantage as different embodiments may have different objects, features, or advantages.

According to one aspect, regenerative braking is made dynamic, so that the amount of deceleration imparted by regenerative braking changes depending on the environment in front of the user vehicle. For Dynamic RB (DRB) mode 1, upon accelerator pedal release target acceleration must be greater than or equal to the acceleration of the RB level. Since mode 1 assumes the driver will press on the brake pedal, the level of RB does not change once the level is selected at accelerator release. The DRB level is reset when the driver returns their foot to the accelerator pedal in a positive manner. For DRB mode 2, the amount of regenerative braking applied remains dynamic from the time the driver releases the accelerator pedal to when the driver applies the brake pedal. DRB has to potential to extend the drivers kinematic deceleration advantage by starting the braking process as soon as the driver releases the accelerator pedal in context of the threat ahead, rather than when the driver presses the brake. Another advantage of DRB is it does not take over the braking process by automating it, it simply gives the driver additional assistance. By not automating the braking process, the driver is still in control of the vehicle. Such context-related driver assistance has the potential to further enhance crash avoidance and avoiding crashes altogether or reduce their severity.

According to another aspect, a method for dynamic regenerating braking of a vehicle is provided. The method includes sensing one or more parameters associated with a driving environment of the vehicle, adjusting by an electronic device a dynamic regenerative braking level prior to initiation of braking in response to the one or more parameters, and resetting the dynamic regenerative braking level by the electronic device. The step of resetting the dynamic regenerative braking level by the electronic device may occur when an accelerator interface is re-engaged such as when the accelerator interface includes an accelerator pedal and wherein the accelerator pedal is re-engaged when a vehicle operator applies pressure to the accelerator pedal. The accelerator interface may be an accelerator pedal, a throttle grip, a machine interface, or other type of accelerator interface. The method may further include actually applying regenerative braking at the dynamic regenerative braking level and prior to resetting the dynamic regenerative braking level by the electronic device. The one or more parameters are associated with a driving environment and may be indicative of a potential collision. The one or more parameters associated with the driving environment may be sensed using a vision system. The one or more parameters may be associated with the driving environment in a forward direction of the vehicle, the vehicle traveling in the forward direction. The method may further include adjusting the dynamic regenerative braking level a plurality of times prior to initiation of the braking. The electronic device may be associated with a crash avoidance system of the vehicle. The method may be performed using a crash avoidance system of the vehicle. The vehicle may be an autonomous or semi-autonomous vehicle.

According to another aspect, a system for dynamic regenerative braking of a vehicle is provided. The system includes a plurality of sensors for sensing one or more parameters associated with a driving environment of the vehicle and an electronic device in operative communication with the plurality of sensors, the electronic device configured to adjust a dynamic regenerative braking level prior to initiation of braking in response to the one or more parameters and further configured to rest the dynamic regenerative braking level. The electronic device may be further configured for controlling applying of regenerative braking at the dynamic regenerative braking level prior to resetting the dynamic regenerative braking level. The plurality of sensors may include sensors associated with a vision system.

According to another aspect, a method for dynamic regenerative braking of a vehicle is provided. The method includes sensing one or more parameters associated with a driving environment of the vehicle, the one or more parameters including parameters determined using a vision system of the vehicle position to capture the driving environment in a forward direction. The method further includes adjusting by an electronic device a dynamic regenerative braking level prior to initiation of braking in response to the one or more parameters. The method further includes resetting the dynamic regenerative braking level by the electronic device when the vehicle operator applies pressure to an accelerator interface. The accelerator interface may include an accelerator pedal. The method may further include applying regenerative braking at the dynamic regenerative braking level and prior to resetting the dynamic regenerative braking level by the electronic device.

BRIEF DESCRIPTION OF THE DRAWINGS

FIG. 13 illustrates acceleration profile averages for all DRB levels and foot transfer times.

DETAILED DESCRIPTION

I. Introduction

Figure 1:
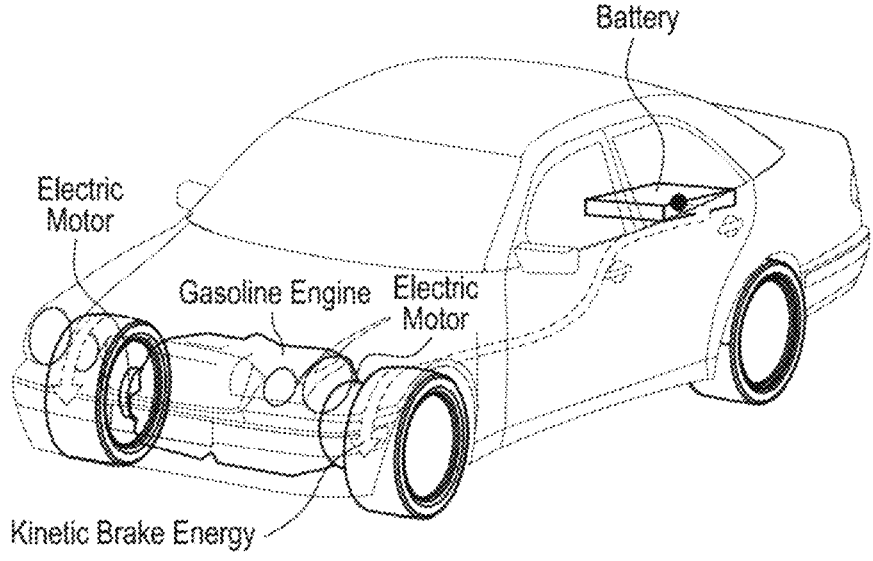
FIG. 1 illustrates a conceptual regenerative braking model (Lampton, 2021).
Figure 1:
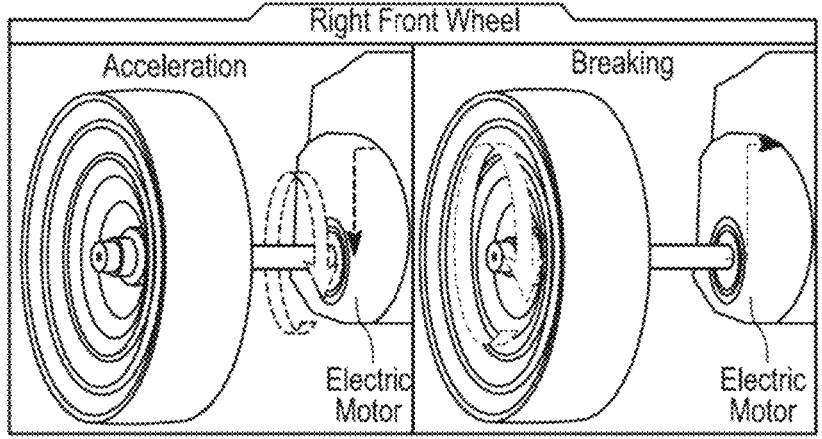
Figure 2:
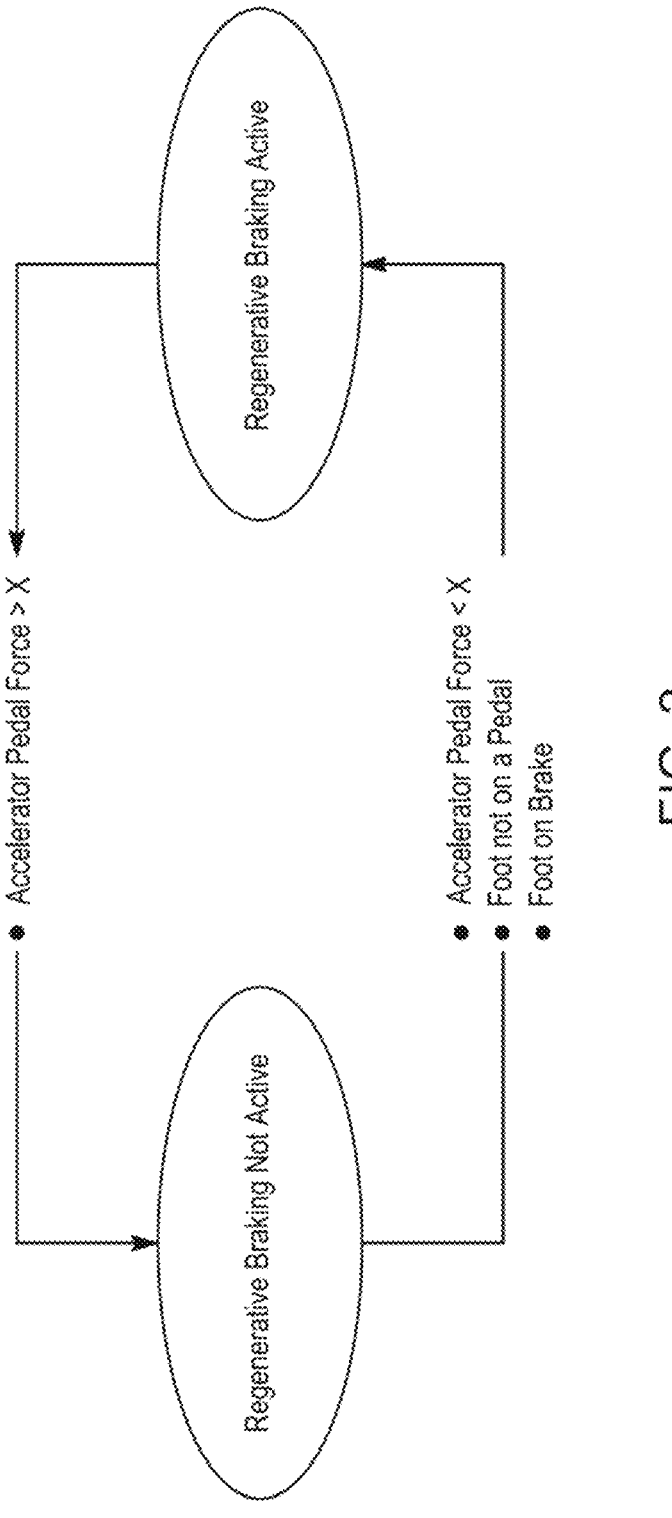
FIG. 2 is a Regenerative Braking State Diagram.
Figure 3:
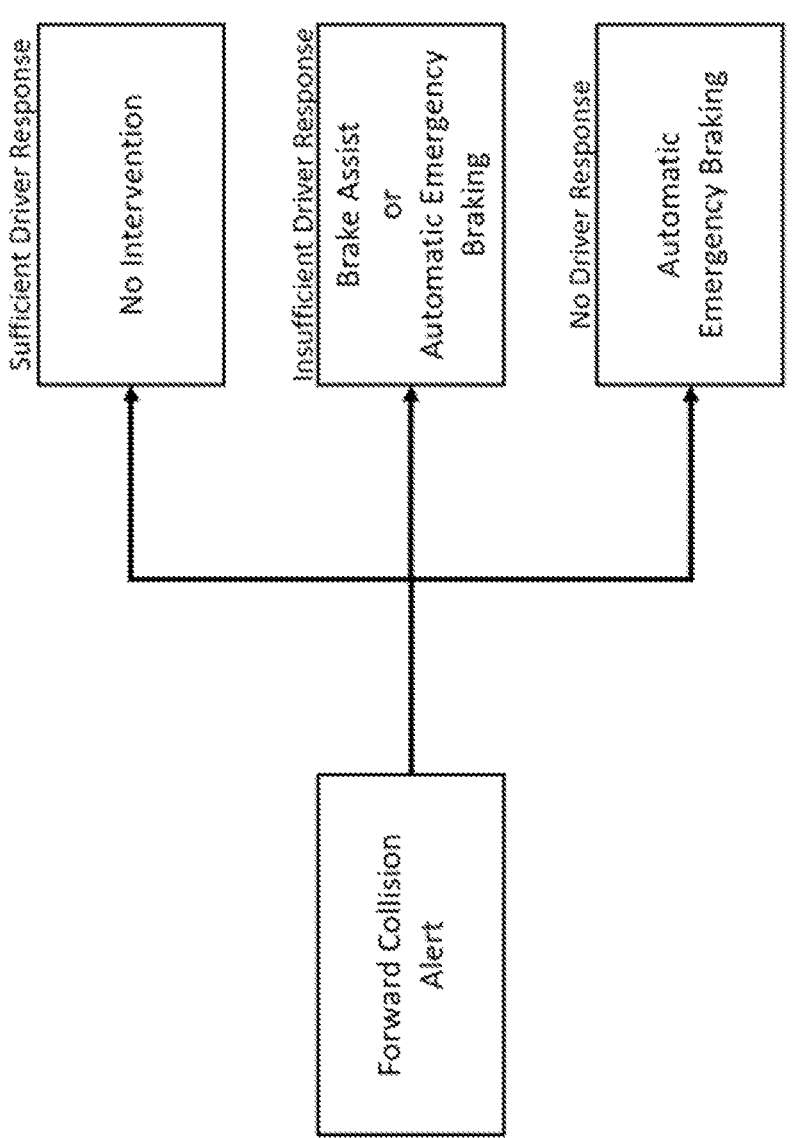
FIG. 3 illustrates a model determining ADAS system.

One major gap in the literature is the notion that RB can be more dynamic in its deceleration, not just decelerating at a standard rate in all contexts. The present disclosure describes a new form of RB which is referred to herein as "dynamic regenerative braking" or DRB. DRB is an integration of a number of systems namely ACC (adaptive cruise control) and AEB. It is a system that alters the level of RB imparted on the driver, based on the roadway environment in front of the user vehicle.

Dynamic RB (DRB) is a newly proposed term describing a system that would be able to increase the RB level and therefore augment the braking process depending on the urgency of the traffic conflict and/or roadway context. The adaptive process would take place between throttle release and service brake application. An advantage of DRB is that it adds assistance in the time period between throttle release brake press but does not automate the braking process, initially. This means the driver remains in control until AEB is triggered (if the conditions meet AEBs operating characteristics).

Target acceleration and time-to-collision (TTC) may be used as the variables that drive this concept. Exemplary requirements for the DRB model include a real-time safety distance/buffer, deceleration profile of user vehicle, and prediction of lead vehicle's travel distance. DRB may rely on forward detection systems such as computer vision, LiDAR and/or radar to provide the lead vehicle information to the system so that the appropriate level of real-time deceleration (RB) is being implemented.

DRB provides the ability for a spectrum of decelerations in crash avoidance. AEB is a system that intervenes based on binary control—it is either triggered on at one rate or not at all. If a forward crash is imminent, then AEB is triggered and the vehicle brakes as intensely, if there is no intervention by the driver in the form of service braking. With DRB, as a user drives their vehicle, DRB sensors may constantly look over the shoulder of the driver, and provide extra assistance during the time period in which the driver transfers their foot from the accelerator to the brake. Unlike traditional RB, in collision situations, DRB may decelerate at more appropriate levels that would not necessarily be as intense as AEB.

A. Research Questions

The first question this disclosure addresses is: what are the thresholds where RB can prevent a crash? This question will be answered by modelling many different levels of RB, ranging from what would be equivalent to coasting to about half the maximum brake force of the vehicle. The part of the model that will be manipulated is the time between throttle release and brake press, the level of RB provided during this period, and the initial vehicle speed. The assumption is that every brake is a panic brake, meaning brake assist will be active once the brake pedal is depressed and the vehicle is slowing at its maximum rate.

Finally, using the blueprint laid out in the research question above, a dynamic form of regenerative braking is proposed and modelled.

B. Assumptions

For this example, there are three main assumptions. The first assumption is that the speed and position of the lead vehicle is provided through vision-based detection. This assumption is made because many vision-based systems that exist offer position as well as speed of objects [8]-[11]. The second assumption is that the driver is fully attentive. DRB is not built to take control away from the driver. It is designed to provide the driver with a maximum braking advantage by initiating a tailored deceleration process as soon as the driver releases their foot from the accelerator, rather than when the driver presses on the brake. DRB also does not provide maximum brake force so that it does not crossover or interfere with automatic emergency braking. The final assumption is when the driver of the user vehicle steps on the brake pedal, it is a full brake press, and the maximum deceleration is allotted.

II. Methods

A. Model

Figure 4:
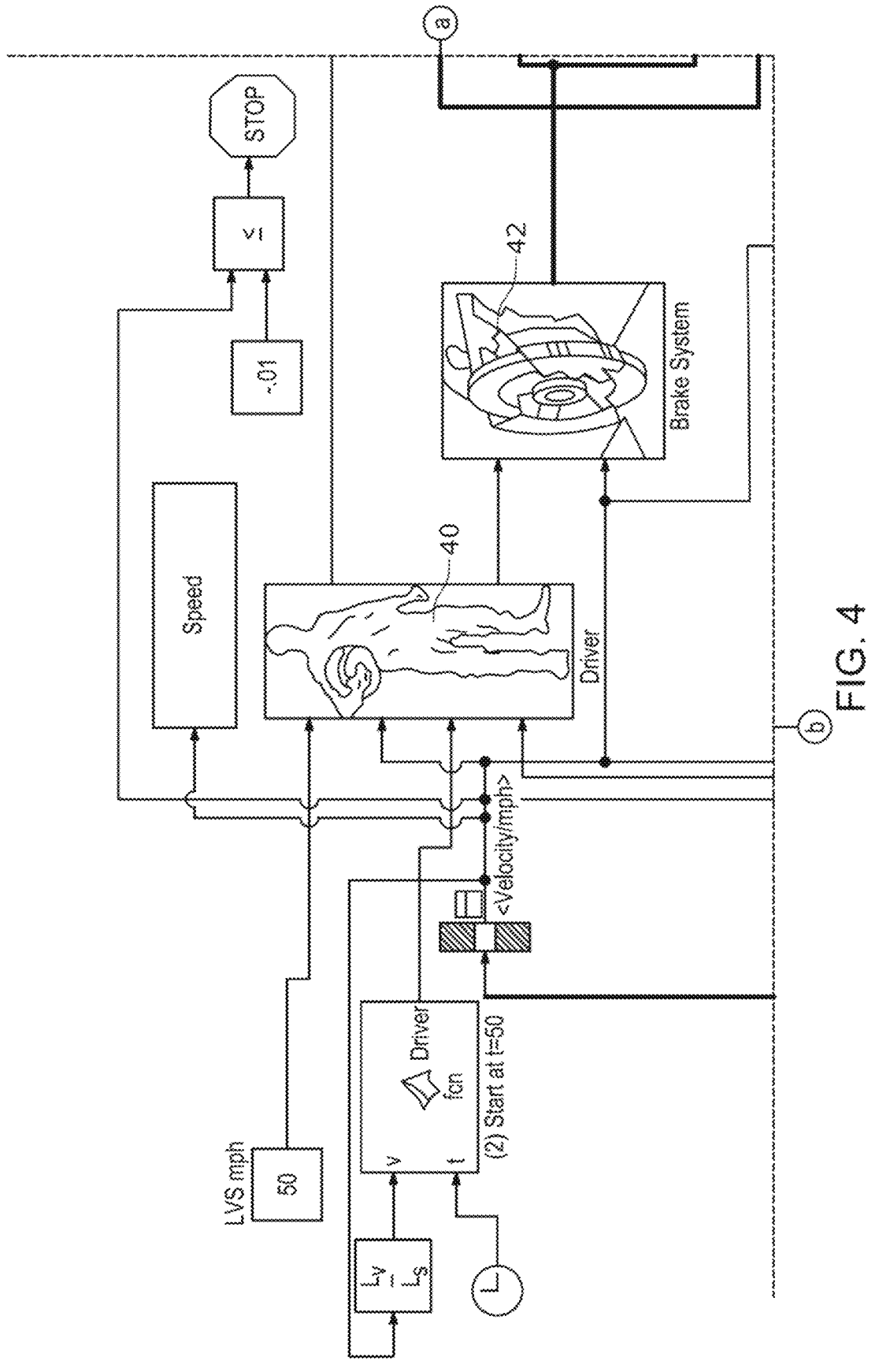
FIG. 4 is a DRB model screen shot (Simulink).
Figure 4:
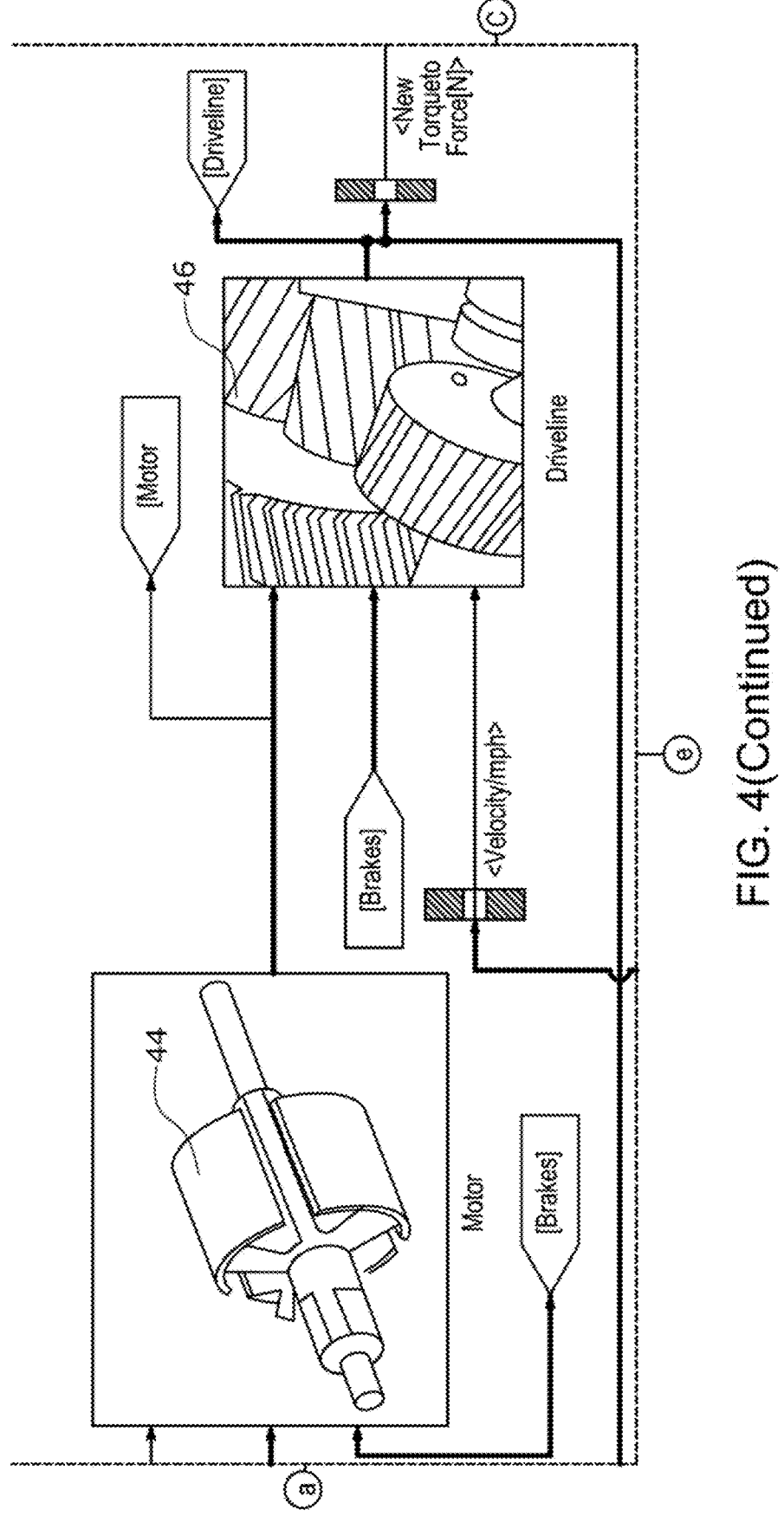
Figure 4:
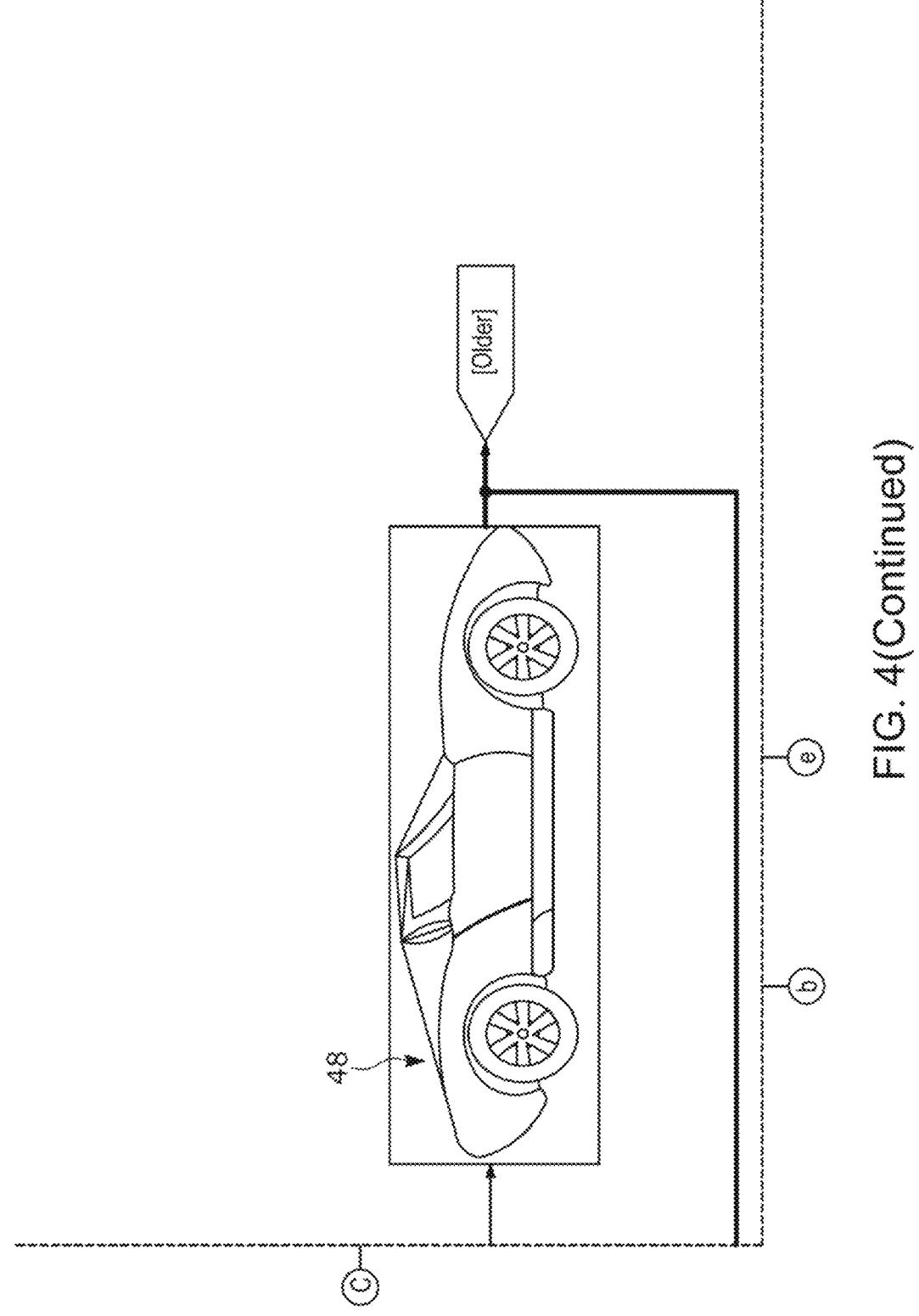
Figure 4:
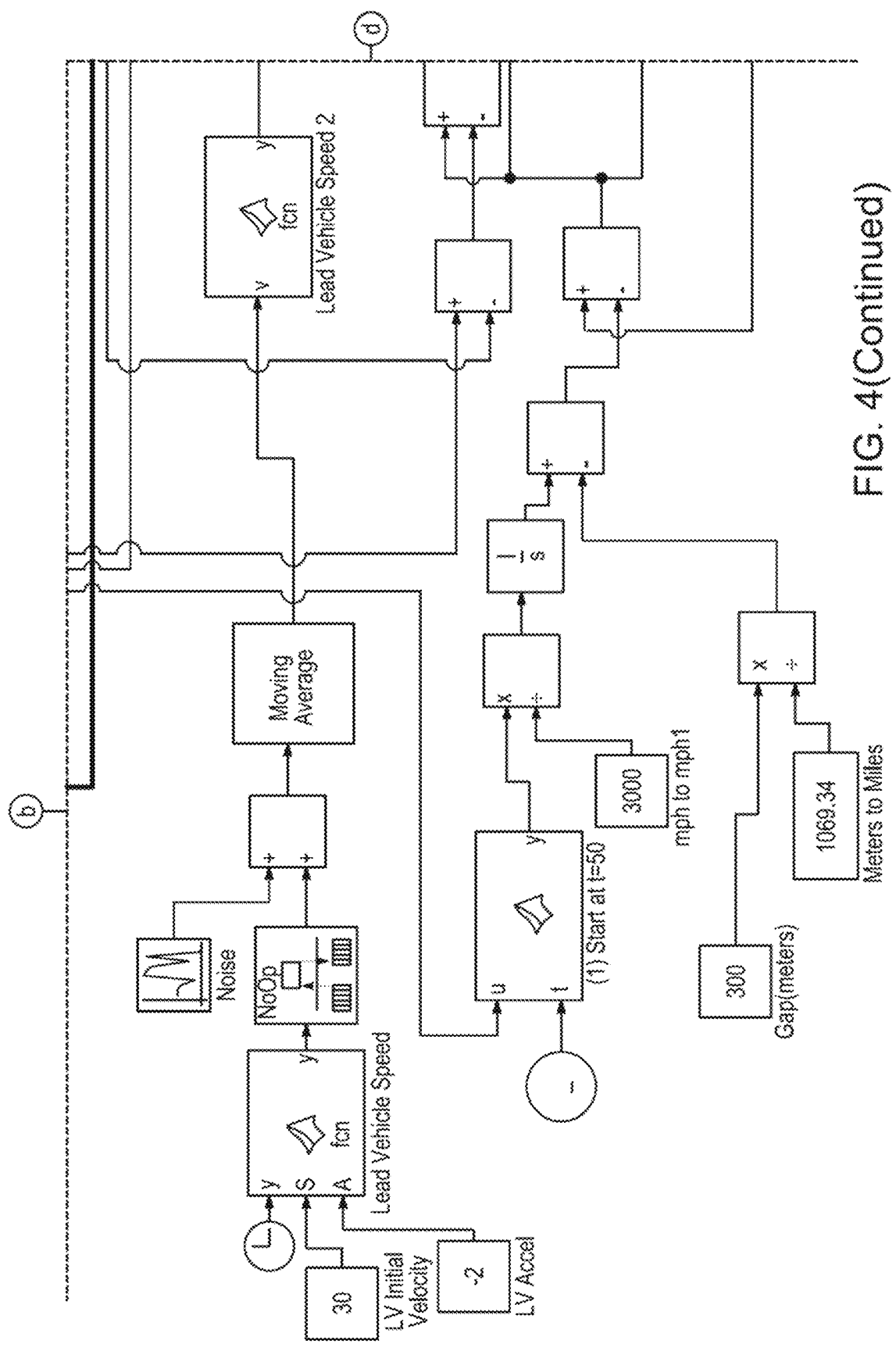
Figure 4:
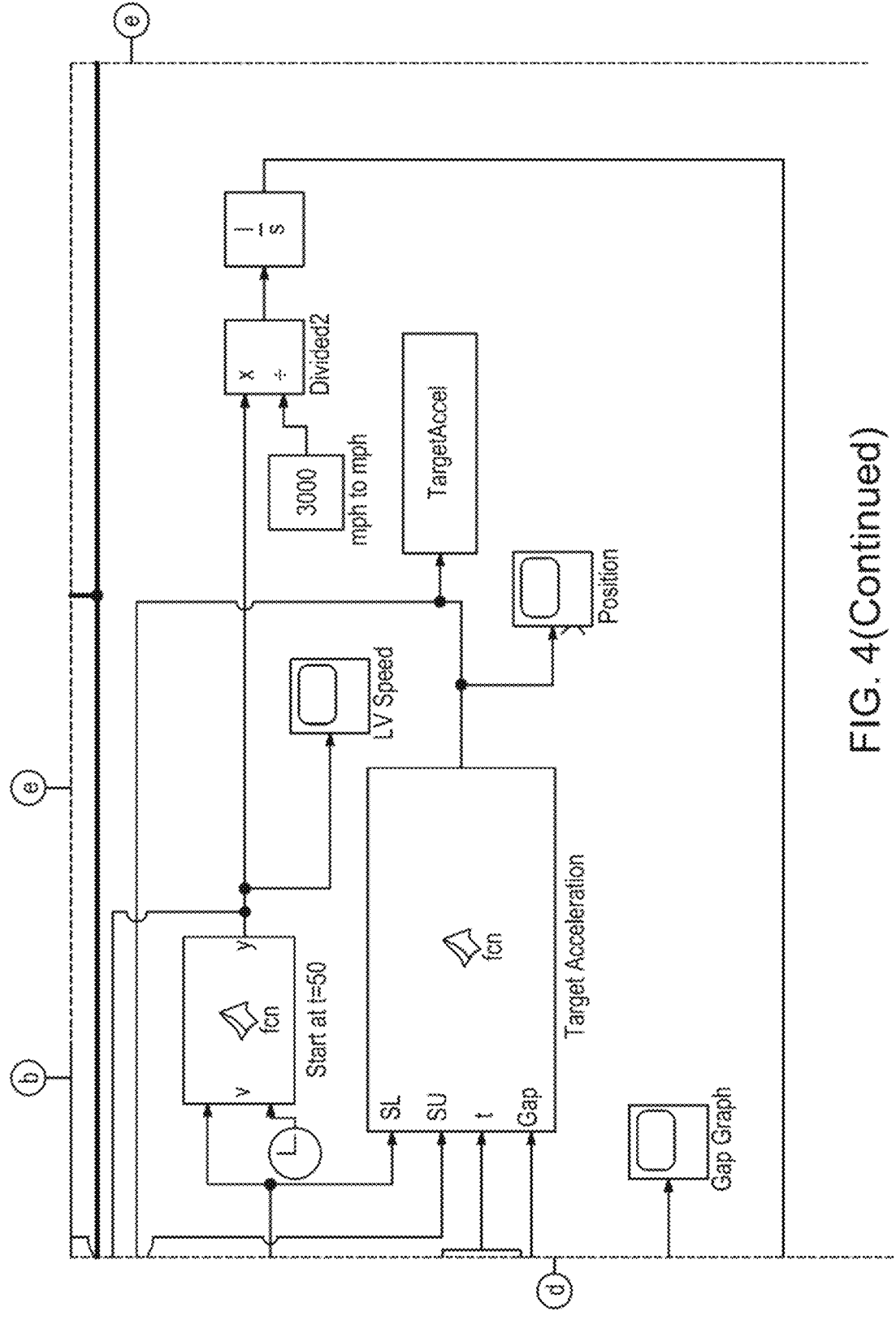

The model used to simulate RB and DRB was adapted from MATLAB and Simulink Racing Lounge [12]. The model was built using Simulink. Simulink is a MATLAB based block diagram environment used for simulations and Model Based Design. The original model consisted of five main inputs as shown in FIG. 4. The inputs may include a 'Driver' block 40, a 'Brake System' block 42, a 'Motor' block 44, a 'Driveline' block 46, and a 'Glider' block 48.

The first input is the 'Driver' block 40, which is the model controller. The model is controlled via brake pedal position and accelerator pedal position. The inputs shown are drive cycle speed (the desired initial vehicle speed), vehicle speed (the actual speed of the vehicle), target acceleration, and vehicle acceleration. The outputs shown for this block are accelerator pedal position and brake pedal position.

The second input is the 'Brake System' block 42. The inputs are the brake pedal position and the vehicle speed. This block is where all braking for this simulation is modelled. The output of this block is braking output using the units Newton and Newton-meter.

The third input is the 'Motor' block 44. The inputs being used for this block are the accelerator pedal position, motor speed, and braking command. The output for this block is the motor output. This block is only used to get the simulated vehicle up to the desired initial vehicle speed.

The fourth input is the 'Driveline' block 46. This block has three inputs: vehicle speed, motor torque, and brake force. The output for this block is the net tractive force.

The fifth input is the 'Glider' block 48. The glider simulates the physical, non-mechanical aspects of the vehicle. The input for this block is tractive force. It considers aerodynamic drag, rolling resistance and grade force. The output used for this block is the vehicle velocity.

B. DRB Modes

Two different modes of DRB were created for the model. In the first mode, DRB is tuned with the expectation that the driver will apply the maximum brake after their foot transfers from the accelerator to the brake pedal. Previous research shows that the mean foot transfer time for SB is 0.44 seconds, and for a high level of RB, it is 0.758 seconds (Mitropoulos-Rundus et al., 2021). The model is tuned to be conservative and predicts that the driver will take 1 second to transfer from the accelerator to the brake pedal.

Figure 5:
FIG. 5 illustrates acceleration vs. initial vehicle speed for all DRB levels. Accelerator release to brake press (ATB) is 1,000 msec.
Figure 5:
Figure 7:
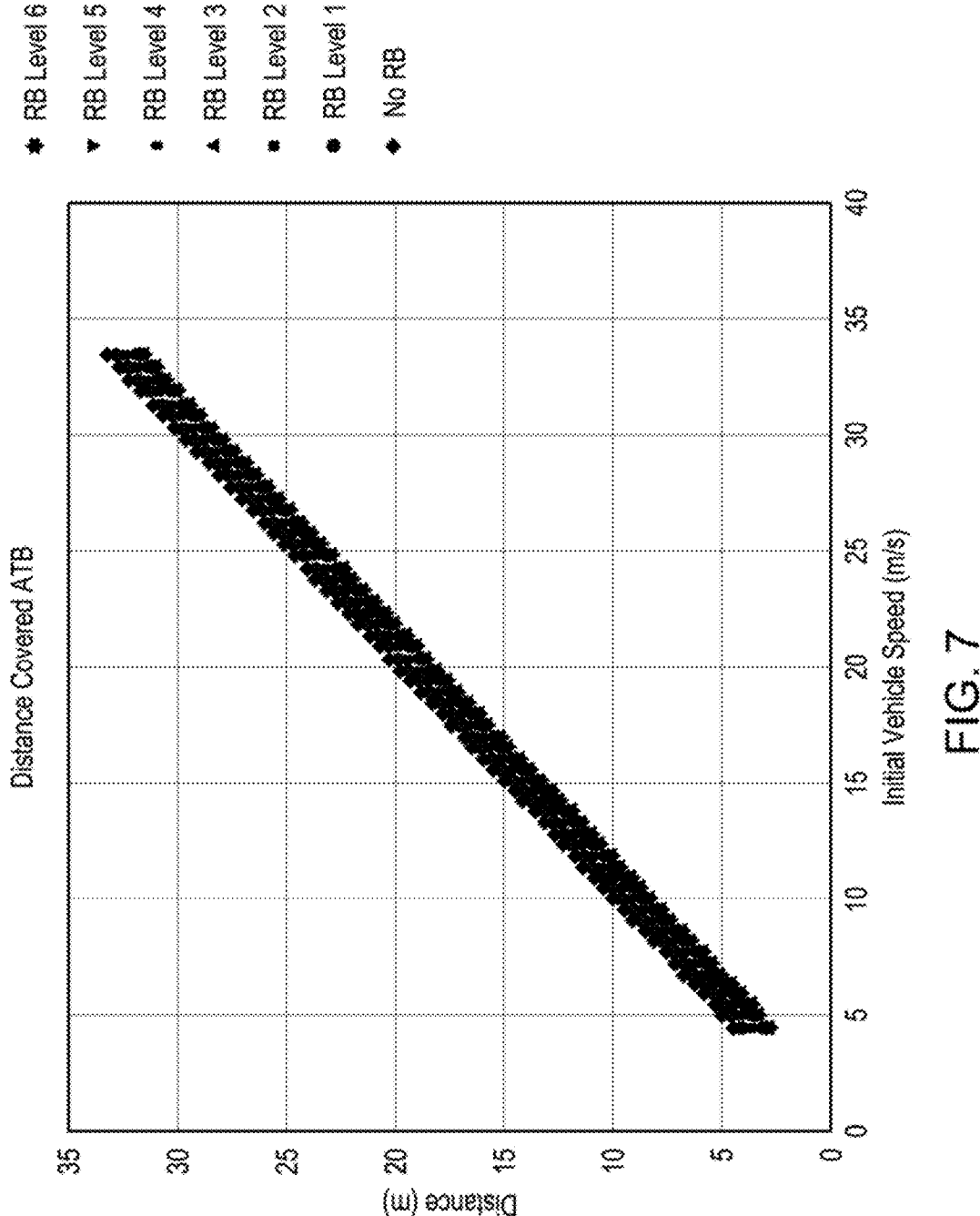
FIG. 7 illustrates distance covered by the vehicle during the foot transfer. ATB time=1,000 msec.
Figure 8:
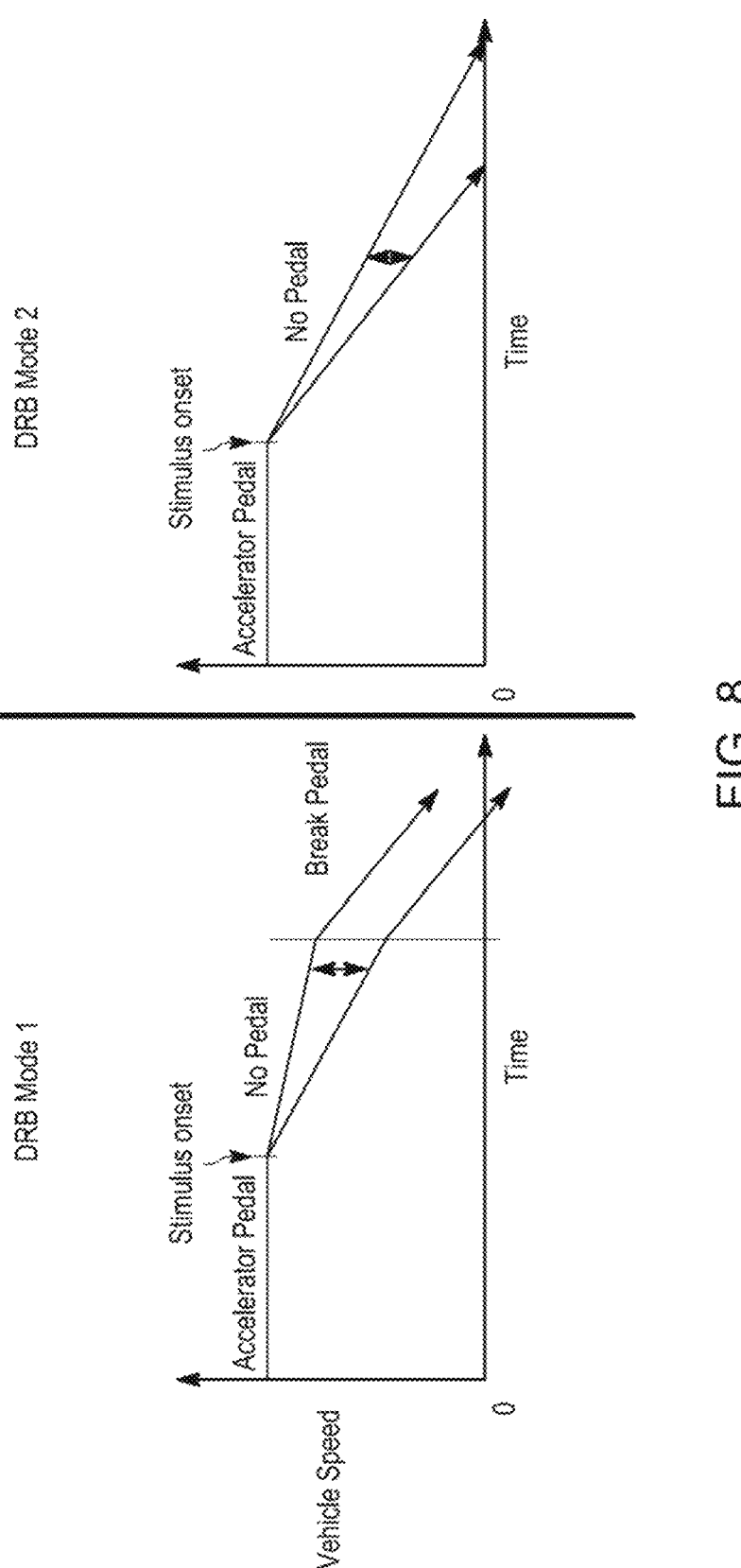
FIG. 8 provides graphs showing the conceptual difference between mode 1 and mode 2 of DRB.

FIG. 5 shows the acceleration vs. initial vehicle speed for all the RB levels of an accelerator to brake (ATB) foot transfer time of 1,000 msec. FIG. 7 shows the distance travelled during this time for the various levels of RB. For mode 1, the level of RB is dependent on the acceleration required to avoid a crash. This is defined as the target acceleration of the user vehicle (TAUV). To ensure a collision is avoided, the following logic is applied:

$$TAUV >= \text{Acceleration of } RB \text{ Level} \qquad (1)$$

Target acceleration must be greater than or equal to the acceleration of the RB level, because if the vehicle is braking, the acceleration is negative. This logic ensures that, at least, the minimum amount of braking is applied. The level of RB is chosen at accelerator release. Since mode 1 assumes the driver will press on the brake pedal, the level of RB does not change once the level is selected at accelerator release. The DRB level is reset when the driver returns their foot to the accelerator pedal in a positive manner.

Figure 6:
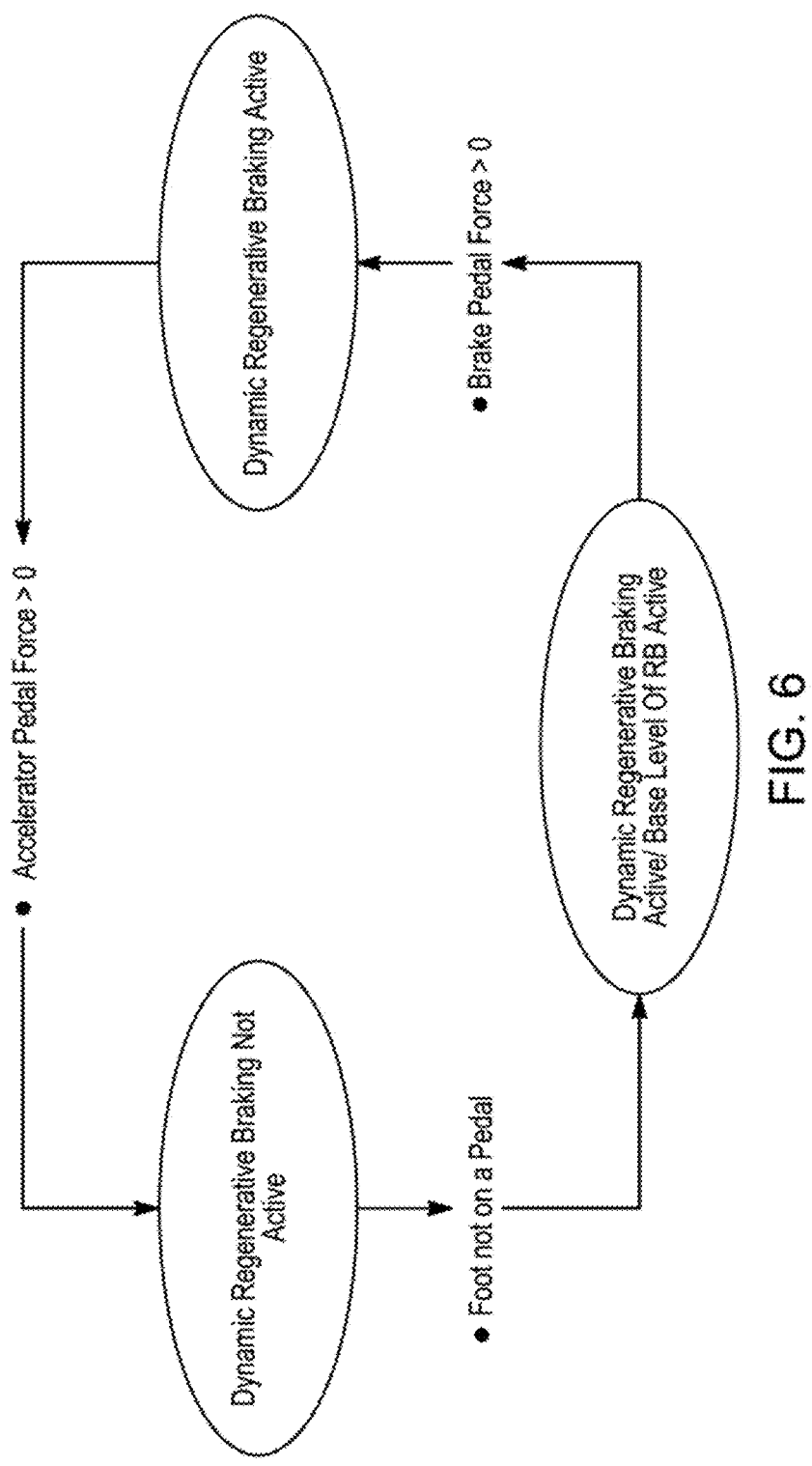
FIG. 6 is a state diagram for DRB Mode 1.

FIG. 6 is a state diagram which represents when DRB is active for mode 1. The base level of RB is a lower level of RB, and it is the minimum amount of RB that is imparted regardless of the target acceleration. This level can be chosen by the driver.

In the second mode, DRB is tuned with the expectation that the driver does not need to press on the brake pedal. The amount of regenerative braking applied remains dynamic throughout the braking process, until the driver applies the brake pedal. Driver input may still be required if drastic changes to the time to collision equation were to occur, or if the braking required exceeds the limits of the amount of braking RB can provide. This mode is like one pedal systems, except with the brake being used seldomly. The difference between this mode and one pedal systems is that one pedal systems apply the maximum amount of brake force when the accelerator pedal is released [14]-[16]. These one pedal systems have been applied to vehicles using RB and SB. This mode of DRB only applies as much regenerative braking that is needed to prevent a collision with the lead vehicle. This means that the amount of braking imparted on the vehicle when the accelerator is released can range from none to the maximum possible that can be applied by regenerative braking. If the maximum brake force RB can apply is not sufficient to avoid a collision, the driver must use the brake pedal to activate the service brakes. Mode 2 constantly updates the target acceleration every 0.01 seconds.

C. Target Acceleration

To determine the level of dynamic regenerative braking required, target acceleration (TA) must be calculated. TA is the acceleration required for the user vehicle to not strike the lead vehicle. In order to find target acceleration, the distance of travel for both vehicles are calculated. The distance of travel equations calculate the travel distance (D) of the lead vehicle (LV) and user vehicle (UV) based on their current speed and acceleration [17]. Velocity is represented as V and acceleration is represented as A. The acceleration of the lead vehicle is unknown, so a value of 0 is inserted into the equation:

$$D_{LV} = V_{LV} * t + A_{LV} * (t^2/2) \qquad (2)$$

Similarly, the travel distance of the user vehicle (UV) must be calculated [17]:

$$D_{UV} = V_{UV} * t + A_{UV} * (t^2/2) \qquad (3)$$

For a collision not to occur, the following must be true:

$$V_{UV} * t + A_{UV} * (t^2/2) < \text{Gap} + V_{LV} * t \qquad (4)$$

The gap refers to the space between the two vehicles. If this inequality is true, then the user vehicle will, based on both vehicles' current speed, not collide with the lead vehicle. If the travel distance of the user vehicle is greater than or equal to the travel distance of the lead vehicle plus the gap between the vehicles, then a collision will occur.

The variable which regenerative braking can manipulate is the acceleration of the user vehicle. The acceleration required to make the inequality true will be called 'target acceleration.' To calculate the target acceleration, simple algebra is used to rearrange the inequality:

$$A_{UV} < (\text{Gap} + V_{LV} * t - V_{UV} * t)/(t^2/2) \qquad (5)$$

The target acceleration equation requires time as a variable. Time to collision yields the amount of time it will take for two vehicles to collide, based on their current position and speed. The time to collision equation below outlines a vehicle-driver combination i at instant t with respect to a lead vehicle i−1 [18]. Ẋ denotes the speed, X denotes the position, and l denotes the vehicle length.

$$TTC_i = \frac{X_{i...1}(t) - X_i(t) - l_i}{\dot{X}_i(t) - \dot{X}_{i...1}(t)} \quad \forall \, \dot{X}_i(t) > \dot{X}_{i...1}(t) \qquad (6)$$

For target acceleration to be valid, the relative speeds (RS) of the two vehicles (speed of user vehicle minus speed of lead vehicle) must be greater than or equal to 0 within the TTC timeframe. Thus, TTC can be used as t in the target acceleration equation:

$$TA_{UV} = (-5 + \text{Gap} + V_{LV} * t - V_{UV} * t)/(t^2/2); \, t = TTC = \text{Gap}/ - (RS) \qquad (7)$$

D. DRB Mode 1

Figure 9:
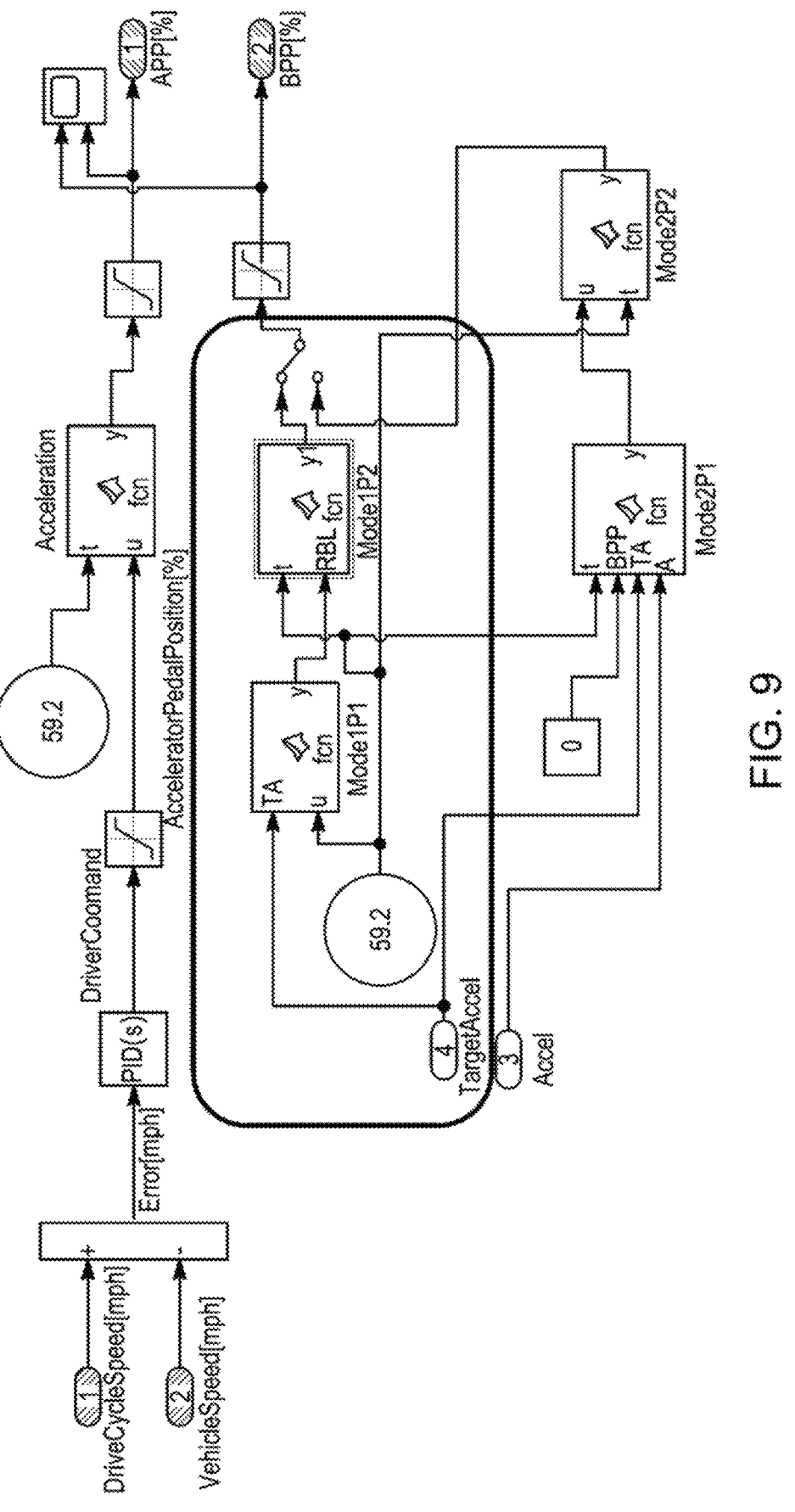
FIG. 9 illustrates Mode 1 of DRB (Simulink).

FIG. 9 shows the driver block of the model. The circled area represents the controls for DRB mode 1. Mode 1 is engaged when the switch to the right of Mode1P2 is in the 'up' position. The first MATLAB Function is labelled Mode1P1 in FIG. 9. The inputs for this block are time and target acceleration. The code for this block sorts which level of regenerative braking should be applied once the accelerator pedal is released. The function is structured so the following can be true:

$$TA_{UV} >= \text{Acceleration of } RB \text{ Level } n \qquad (8)$$

The second MATLAB Function makes it so the level of RB is applied during the time period between accelerator release and brake press.

For mode 1, 6 different levels of RB were created. Table I shows the minimum average acceleration, maximum average acceleration, and average acceleration for each DRB level for speeds 4.5 m/s (10 mph) to 33.4 m/s (75 mph). The values for this table were calculated for a foot transfer time of 1 second. These acceleration profiles were also calculated for foot transfer times from 0.1 seconds to 1.4 seconds, in 0.1 increments.

III. Results

To understand the capabilities of DRB the average acceleration, the speed change and distance covered during foot transfer time were calculated for each of the 6 levels. These values were also calculated for no RB (SB coasting). The speeds tested were 4.496 m/s (10 mph) to 33.41 m/s (74.7 mph). Previous research shows that the mean foot transfer

TABLE I

| | ACCELERATION OF DRB LEVELS DURING FOOT TRANSFER (M/S^2) | | | | | | |
|---|---|---|---|---|---|---|---|
| m/s² | No RB | RB level 1 | RB Level 2 | RB Level 3 | RB Level 4 | RB Level 5 | RB Level 6 |
| Min | −0.2750679 | −0.95403 | −1.68147 | −2.2567431 | −2.79305 | −3.329345 | −3.65987 |
| Max | −0.08394197 | −0.76629 | −1.48223 | −2.0213874 | −2.56068 | −3.005097 | −3.37012 |
| Average | −0.1527332 | −0.83339 | −1.60738 | −2.1729912 | −2.7099 | −3.244703 | −3.54742 |

E. DRB Mode 2

Figure 10:
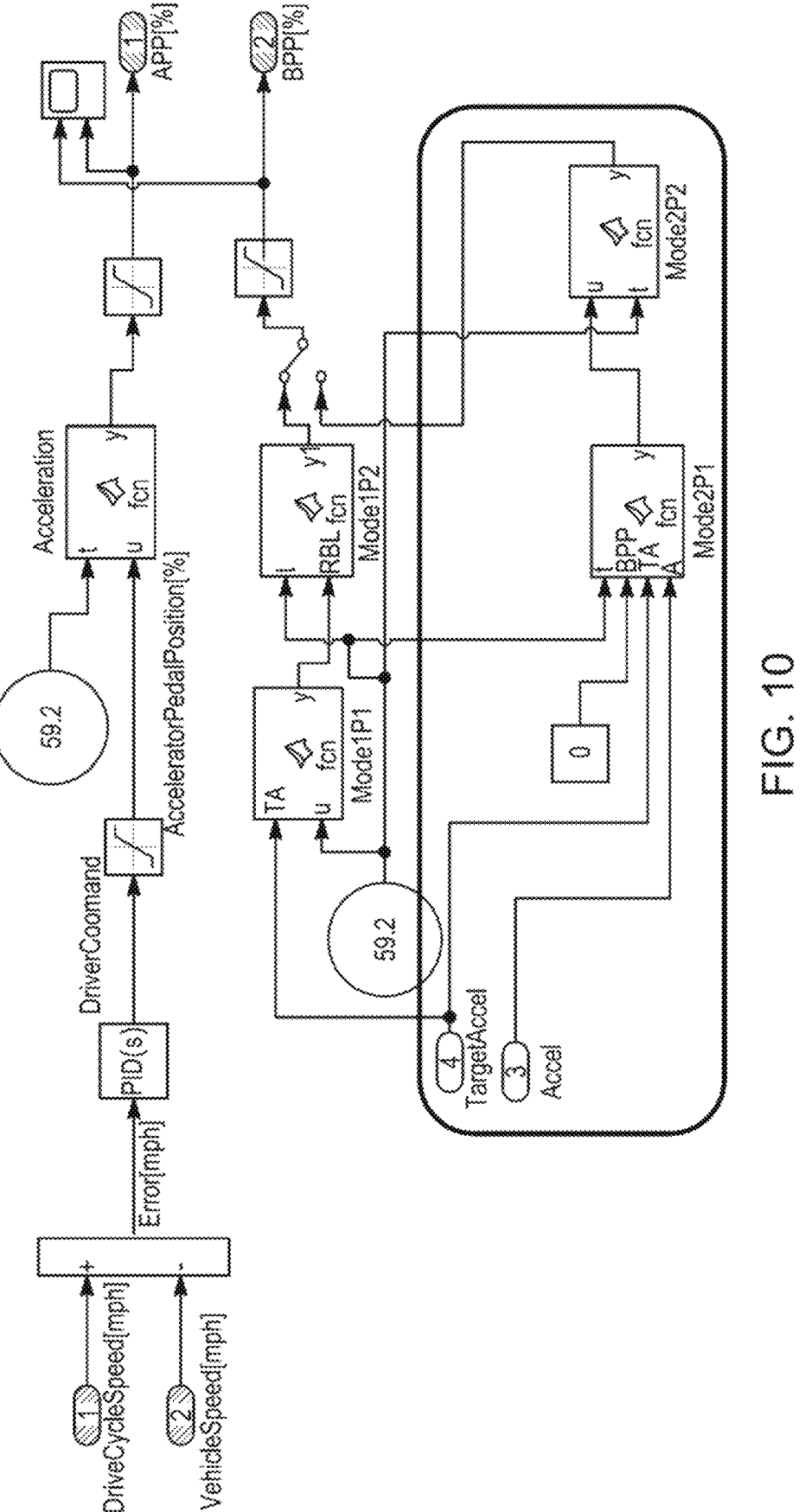
FIG. 10 illustrates Mode 2 of DRB (Simulink).

FIG. 10 shows the driver block with the components of mode 2 DRB outlined. Mode2P1 is a simple piecewise function that increases brake pedal pressure if the vehicle acceleration is less than the target acceleration and decreases brake pedal pressure if the vehicle acceleration is greater than the target acceleration. This algorithm updates every 0.01 seconds. Mode 2 is engaged when the switch to the right of Mode1P2 is in the 'down' position. Mode2P2 delays the start of DRB mode 2 engagement until 50 seconds because the simulation begins at 50 seconds. The time prior is used to get the user vehicle up to speed.

F. User Vehicle Behavior

Figure 11:
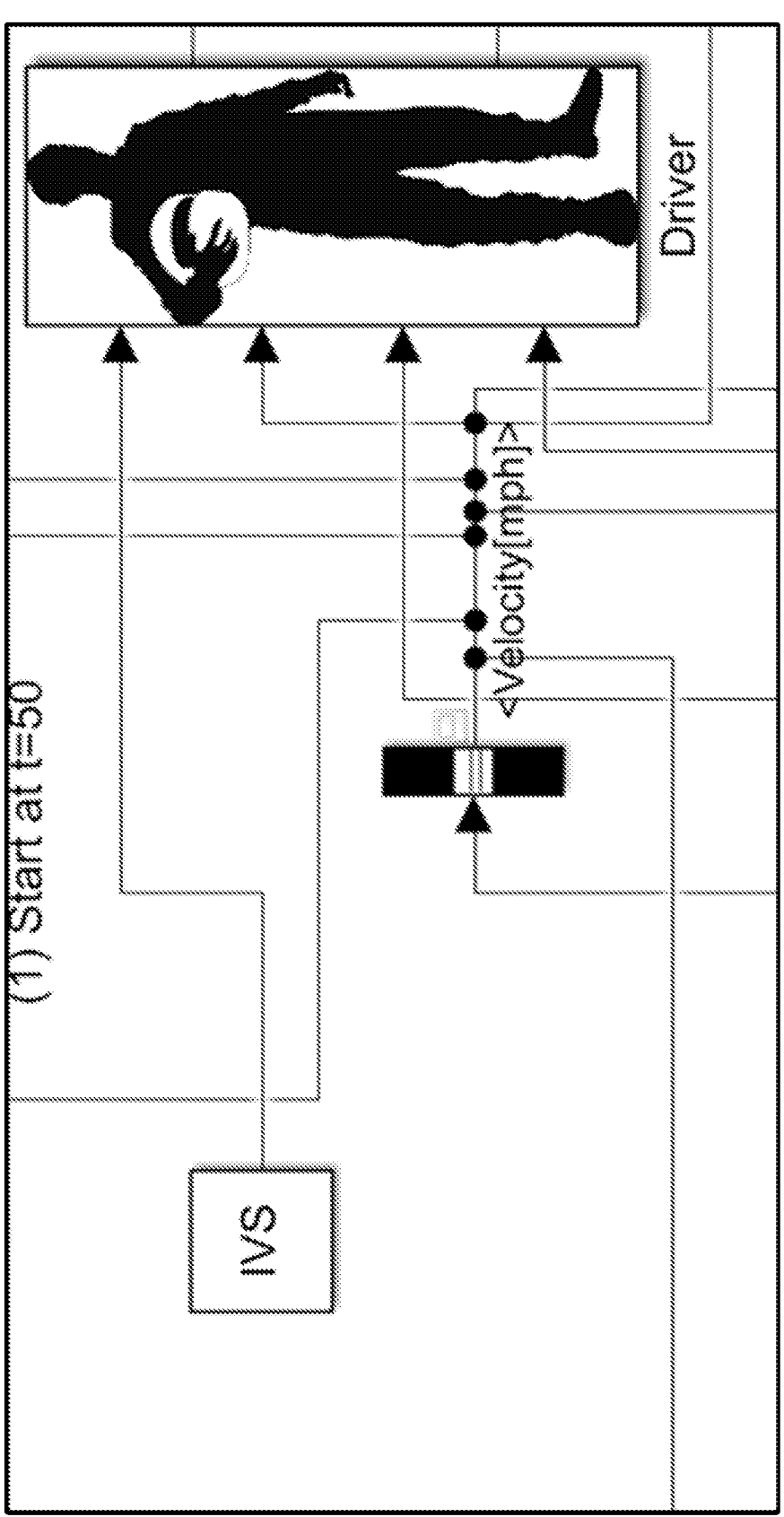
FIG. 11 illustrates Constant for initial vehicle speed (UV).

The approach the simulation is built on requires that the user vehicle begin at 0 mph. The constant block labelled 'IVS' (FIG. 11) inputs the initial vehicle velocity into the model in terms of miles per hour. The model then will run for 50 seconds to get the user vehicle up to the desired speed. Once time is equal to 50 seconds, the rest of the simulation begins.

The simulation is made only to simulate the braking capabilities of DRB. Once the 50 second threshold is reached, the accelerator pedal position is set to 0 for the remainder of the simulation. Depending on the position of the switch, either DRB mode 1 or mode 2 will engage. The simulation ends when the user vehicle speed reduces back down to 0.

G. Lead Vehicle Behavior

Figure 12:
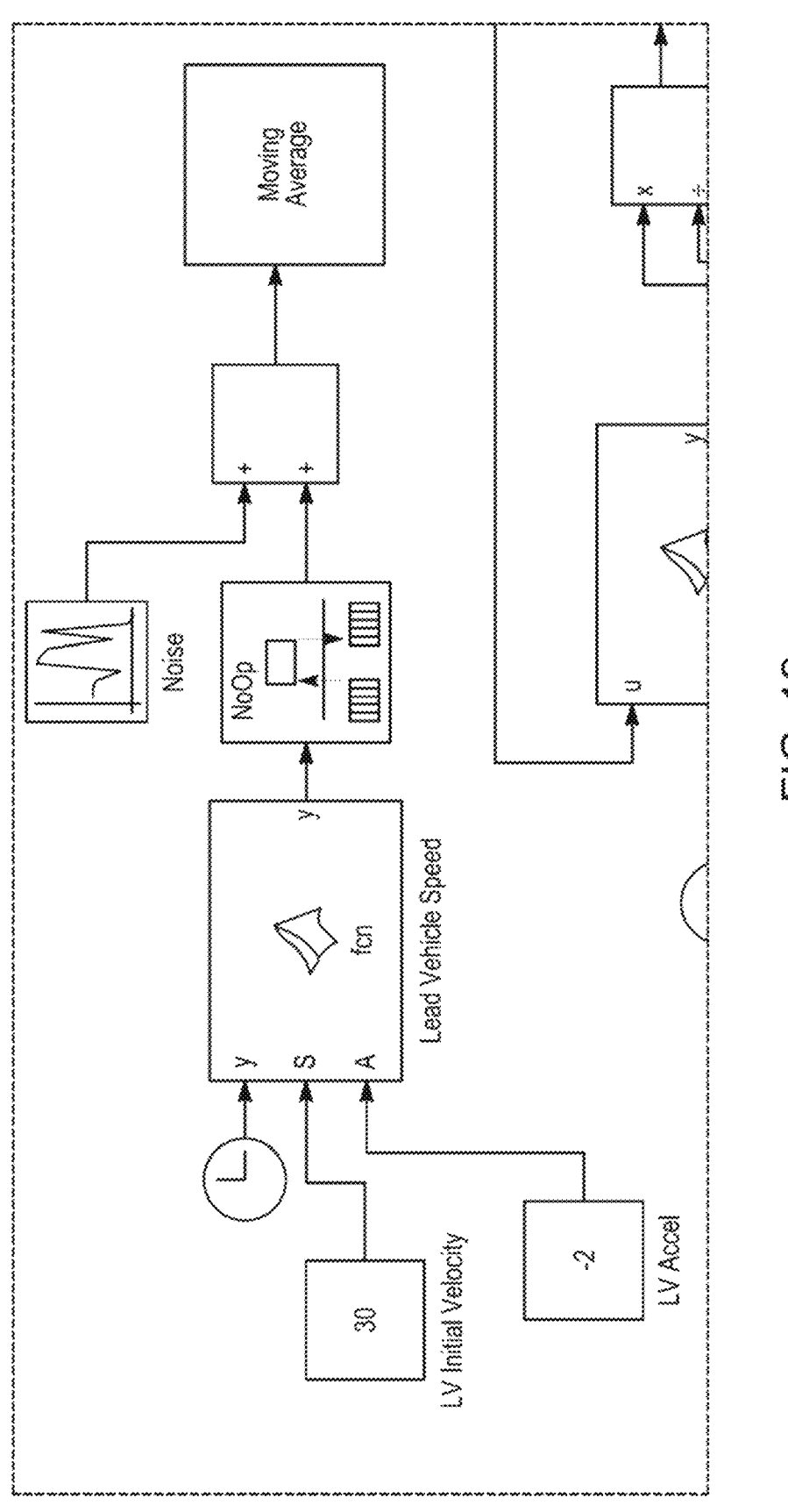
FIG. 12 illustrates Lead Vehicle Behavior (Simulink).

When manipulating the model, there are two controls for the lead vehicle shown in FIG. 12. The first is the lead vehicle initial speed and the second is the lead vehicle acceleration. Both inputs are constants. These constants are then fed into a MATLAB Function called lead vehicle speed. This function is represented by the following equation:

$$\text{Speed} = (\text{Initial Speed}) + \text{Acceleration} * t \tag{9}$$

If implemented into an actual vehicle, there would be some noise associated with the speed output from the camera-based vision system. According to previous research, the larger range of noise is ±0.5277 m/s [10]. To simulate this, a noise block had to be added to the simulation. A moving average filter was added to reduce the noise to something more usable. Since there is not much noise to begin with, advanced filters were not needed.

time for SB is 0.44 seconds, and for a high level of RB it is 0.758 seconds [13]. The acceleration profile of foot transfer times was tested from 0.1 seconds to 1.4 seconds. FIG. 13 shows the acceleration profiles of all the DRB levels and foot transfer times, with the average acceleration of all the initial vehicle speeds also displayed.

Figure 14:
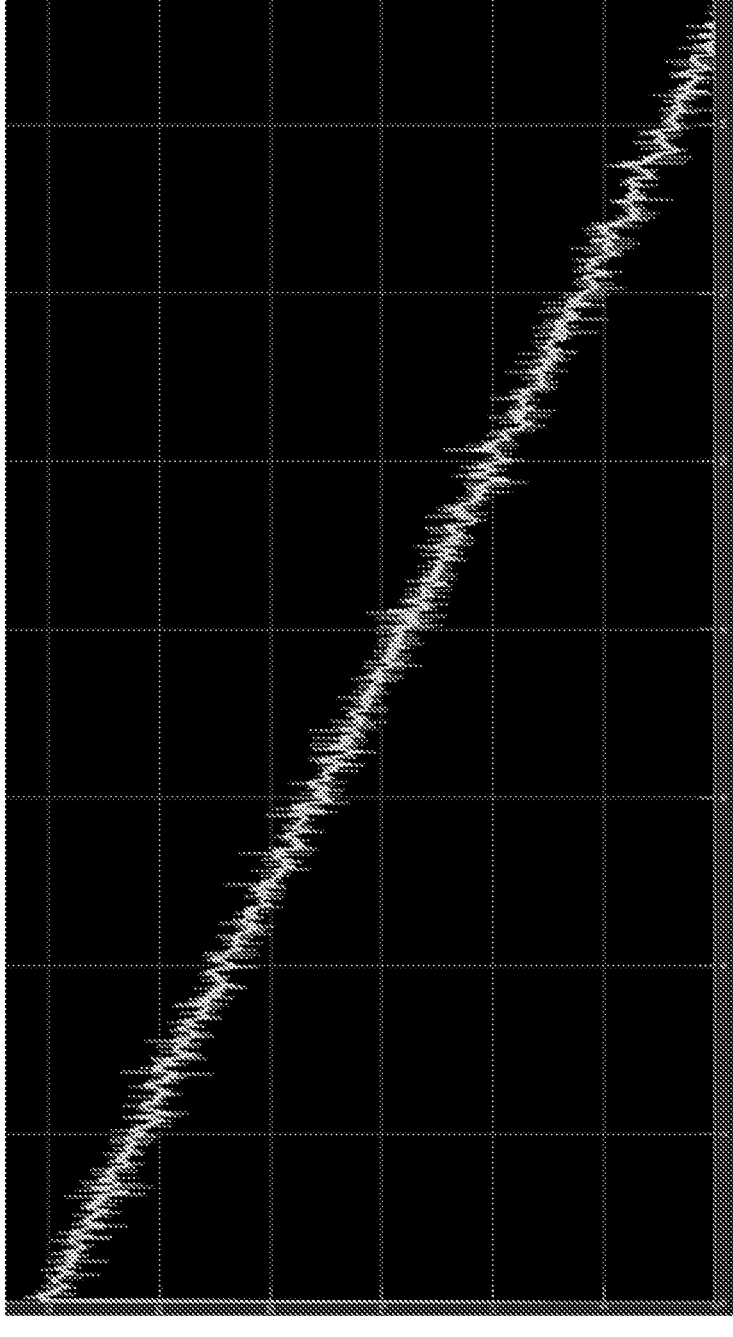
FIG. 14 illustrates lead vehicle speed data. Original (red) and moving average (green).

To cut down on some of the noise from the lead vehicle sensor data, a moving average filter was added to the model. The amount of noise reduced is equal to the square-root of the number of points in the average [19]. In this case, 4 points are included in the average so that the noise is reduced by a factor of 2. FIG. 14 shows an example of the original noisy data and the data after the moving average filter.

Figure 15:
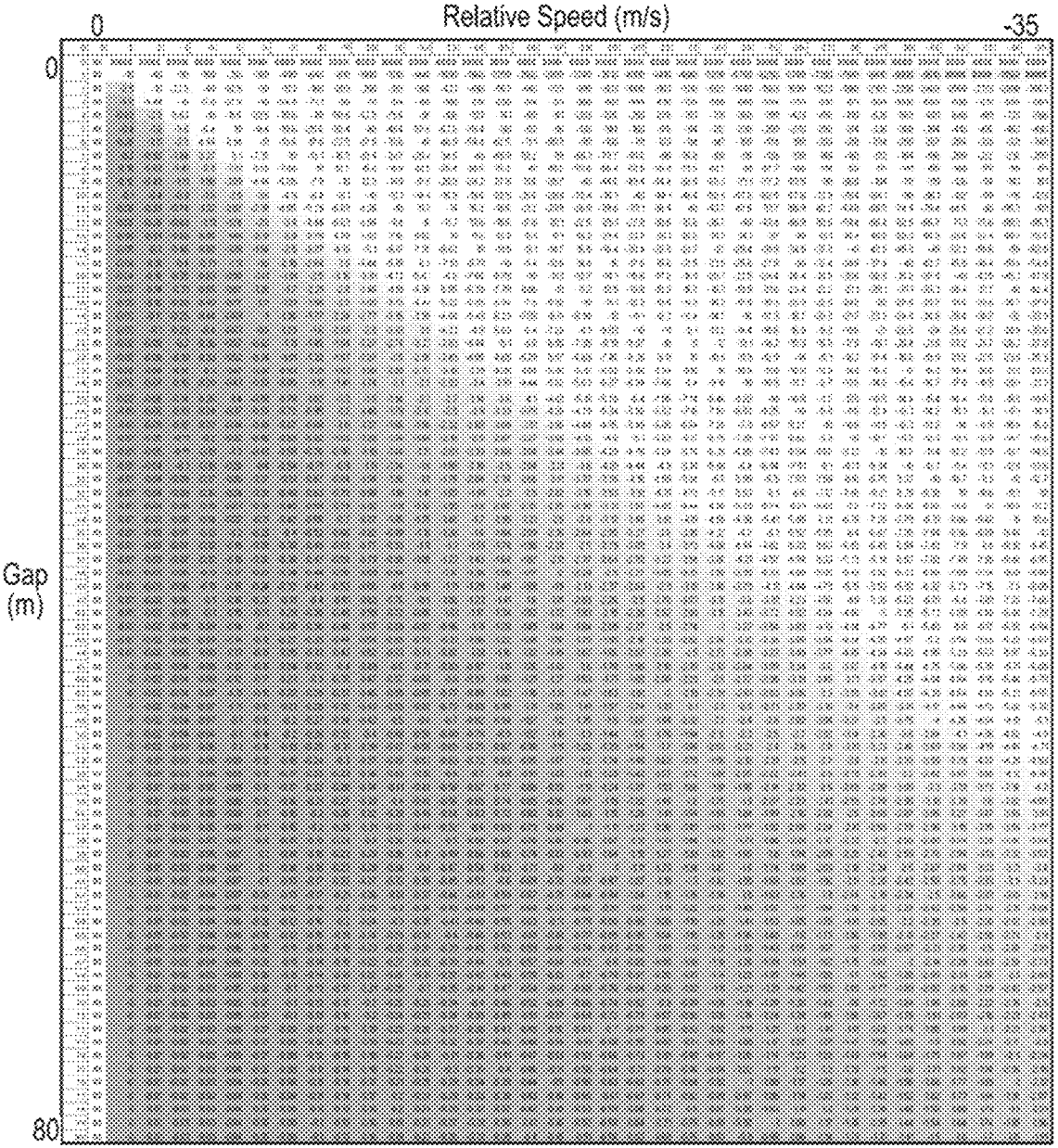
FIG. 15 is a heatmap of target acceleration.

The target acceleration equation has three inputs: TTC, relative speed, and gap. TTC is calculated using relative speed and gap (TTC-Gap/-Relative Speed), which leaves the equation with those two inputs. A sensitivity table was compiled to determine to which of these inputs target acceleration is most sensitive. The results are displayed as a heatmap in FIG. 15. This heatmap shows that the target acceleration equation is more sensitive to changes in the lead vehicle relative speed than it is to changes in the gap between the vehicles. Since target acceleration compares the distance travelled of the two vehicles, relative speed (m/s) and gap (m) are related in the sense that as time goes on, the gap changes depending on the relative speed. For example, if relative speed is zero then the gap would remain the same. If relative speed is positive the gap would increase, and if relative speed is negative (lead vehicle is travelling slower than the user vehicle) the gap would decrease.

IV. Discussion

Previous literature on regenerative braking, largely explores how RB can made more efficient [1], [20]. There is some research that implements RB in collision avoidance systems [13], [21], but there is no current literature on using RB dynamically for crash avoidance. DRB is a system that would be able to increase the RB level and augment the braking process depending on the urgency of the traffic conflict and/or roadway context.

The first research question explored the thresholds where RB can prevent a crash. To answer this question, two modes of DRB were simulated using MATLAB and Simulink. For both modes, DRB is triggered via accelerator pedal release, and gets locked in the mode until the driver's foot returns to the accelerator pedal. The first mode has 6 DRB levels. At accelerator release the model selects the correct level of dynamic regenerative braking such that the target acceleration (acceleration required to avoid a crash) is greater than or equal to the amount of acceleration imparted from the DRB level. It is greater than or less than because the acceleration is negative. The model is tuned to be conservative and predicts that the driver will take 1 second to transfer from the accelerator to the brake pedal.

The second mode is tuned with the expectation that the driver will not press on the brake pedal, unless the braking required exceeds the limits of the amount of braking RB can provide. This mode applies as much regenerative braking that is needed to prevent a collision with the lead vehicle. DRB mode 2 remains dynamic throughout the braking process, updating the target acceleration and the acceleration of the user vehicle every 0.01 seconds.

The acceleration of the vehicle, distance travelled, and speed changes were calculated for all levels of DRB and starting speeds (speed of the vehicle at the point the accelerator pedal was released) from 4.5 m/s (10 mph) to 33.4 m/s (75 mph) to better understand thresholds in which DRB could prevent a crash.

The second research question asked how can RB be made dynamic, so that the amount of deceleration imparted by RB changes depending on the environment in front of the user vehicle. The target acceleration (TA) was used to measure the environment in front of the user vehicle. For DRB mode 1, upon accelerator pedal release target acceleration must be greater than or equal to the acceleration of the RB level. This logic ensures that, at least, the minimum amount of braking is applied. Since mode 1 assumes the driver will press on the brake pedal, the level of RB does not change once the level is selected at accelerator release. The DRB level is reset when the driver returns their foot to the accelerator pedal in a positive manner. For DRB mode 2, DRB is tuned with the expectation that the driver does not need to press on the brake pedal. The amount of regenerative braking applied remains dynamic from the time the driver releases the accelerator pedal to when the driver applies the brake pedal. Driver input may still be required if drastic changes to the time to collision equation were to occur, or if the braking required exceeds the limits of the amount of braking RB can provide. The target acceleration and the respective acceleration of the vehicle is updated every 0.01 seconds.

DRB has to potential to extend the drivers kinematic deceleration advantage by starting the braking process as soon as the driver releases the accelerator pedal in context of the threat ahead, rather than when the driver presses the brake. Another advantage of DRB is that it does not take over the braking process by automating it, it simply gives the driver additional assistance. By not automating the braking process, the driver is still in control of the vehicle. Also, if there is sensor failure, the DRB system can simply shut off, and the safety of the vehicle will not be compromised. Such context-related driver assistance has the potential to further enhance crash avoidance and avoiding crashes altogether or reduce their severity.

Figure 16:
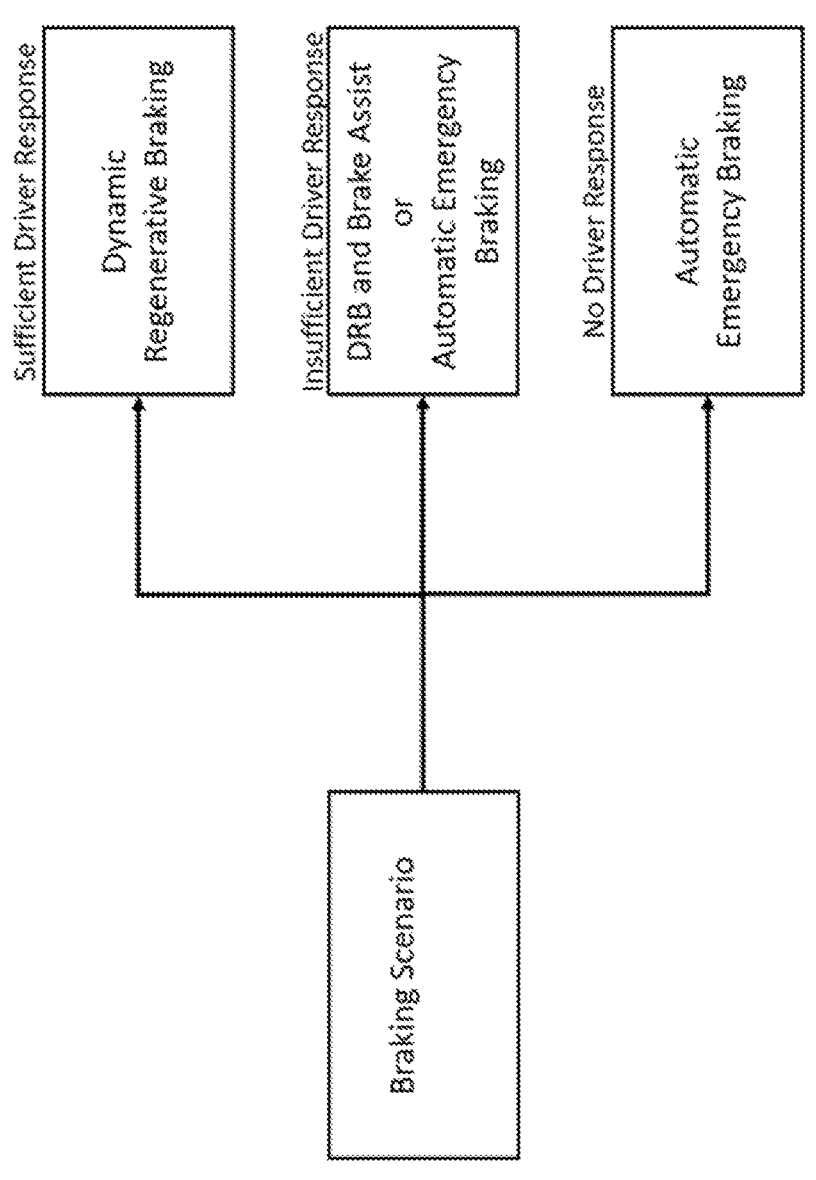
FIG. 16 is a model showing when brake assist, AEB, and DRB are active.

Another advantage of DRB is it does not interfere with other ADAS. FIG. 16 presents a model that shows what ADAS system is necessary based on the situation. AEB can completely take over the braking process if the driver's response is insufficient or if there is no driver response, regardless of the foot behavior of the driver. The kinematic safety advantage imparted by DRB is significant during the time period the driver transfers their foot from the accelerator pedal to the brake pedal. Brake assist is activated if a panic brake is detected. This means the advantage these two systems provide do not cross over. DRB simply begins the braking assistance as soon as the driver releases the accelerator pedal.

It is contemplated that methods may be modified based on results of testing DRB in real-life scenarios including with human subjects such as in simulated environments or through a naturalistic study including testing on how DRB effects driver foot behavior. Extra braking assistance provided to drivers could result in how hard drivers press on the brake pedal, which could result in changes as to what is considered a 'panic brake' for brake assist. It is further contemplated that such behavior may be taken into consideration in the determination of the dynamic regenerative braking.

Figure 17:
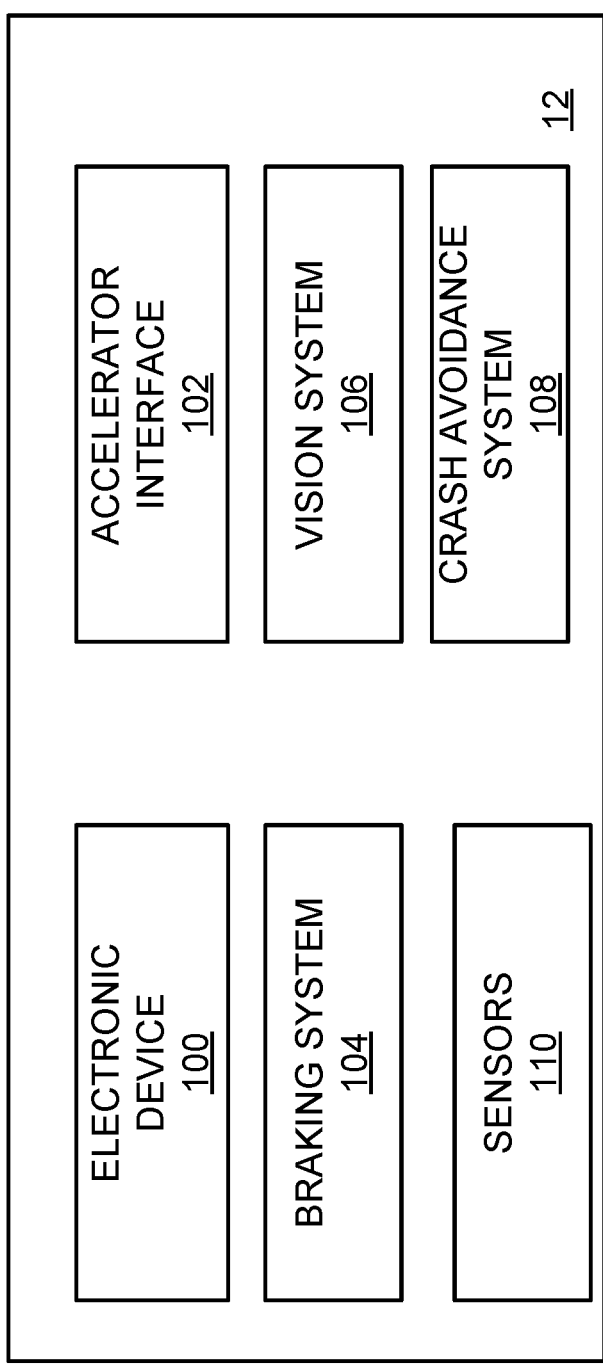
FIG. 17 is a block diagram of one example of a system.

FIG. 17 provides a block diagram illustrating one example of a vehicle 12. The vehicle 12 may include an electronic device 100 which may include one or more processors configured to perform logic and control operations as previously explained. A braking system 104 is shown which may be operatively connected to the electronic device 100. An accelerator interface 102 is shown which may be, without limitation, a pedal, throttle grip, or machine interface. A braking system 104 is also shown which may operatively connected to the electronic device 100. A vision system 106 which may include one or more sensors is shown which may also be operatively connected to the electronic device 100. A crash avoidance system 108 is also shown which may be operatively connected to the electronic device 100. A plurality of sensors 110 also shown which may be operatively connected to the electronic device 100. The sensors 110 may also be associated with the vision system 106. The sensors 110 may be a plurality of sensors for sensing one or more parameters associated with a driving environment of the vehicle 12. The electronic device 100 may be in operative communication with the plurality of sensors 110 and the electronic device may be configured to adjust a dynamic regenerative braking level prior to initiation of braking in response to the one or more parameters and further configured to reset the dynamic regenerative braking level. The electronic device 100 may be further configured for controlling applying of regenerative braking at the dynamic regenerative braking level prior to resetting the dynamic regenerative braking level.

Figure 18:
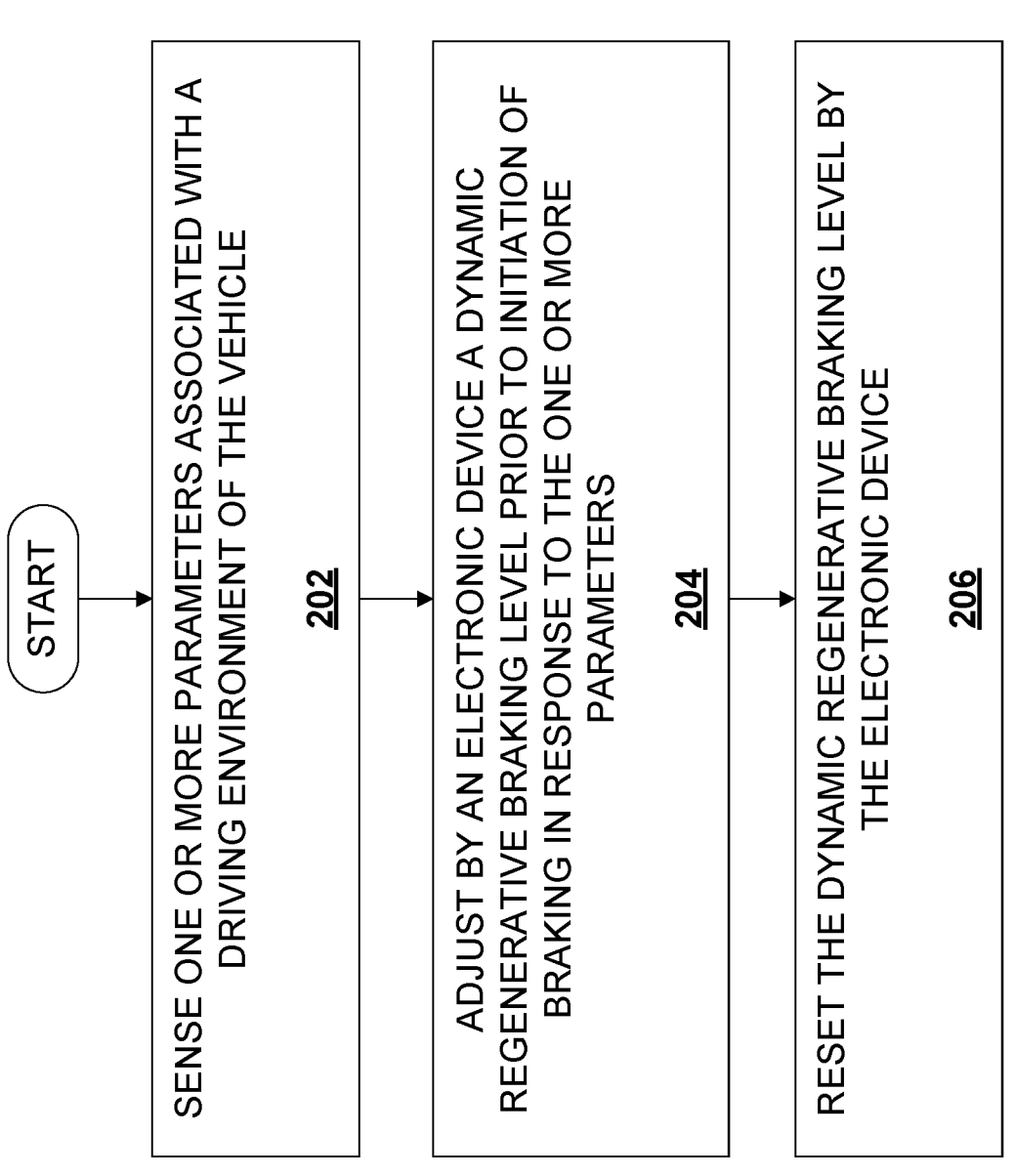
FIG. 18 is a flowchart illustrating one example of a method.

FIG. 18 is a flowchart of an example process. In some implementations, one or more process blocks of FIG. 18 may be performed by a device. As shown in FIG. 18 the process may include sensing one or more parameters associated with a driving environment of the vehicle, the one or more parameters including parameters determined using a vision system to capture the driving environment in a forward direction (block 202). For example, the device may sense one or more parameters associated with a driving environment of the vehicle, as described above. As also shown in FIG. 18, the process may include adjusting by an electronic device a dynamic regenerative braking level prior to initiation of braking in response to the one or more parameters (block 204). For example, the device may adjust by an electronic device a dynamic regenerative braking level prior to initiation of braking in response to the one or more parameters, as described above. As further shown in FIG. 18, the process may include resetting the dynamic regenerative braking level by the electronic device when the vehicle operator applies pressure to an accelerator interface (block 206). For example, device may reset the dynamic regenerative braking level by the electronic device when the vehicle operator applies pressure to an accelerator interface such as a pedal or throttle grip, as described above.

Although FIG. 18 shows example blocks of a process, in some implementations, the process may include additional blocks, fewer blocks, different blocks, or differently arranged blocks than those depicted in FIG. 18.

Options, Variations, and Alternatives

Although various methods, apparatus, and systems have been described throughout, it is to be understood that the present disclosure contemplates numerous options, variations, and alternatives as may be appropriate for use with a particular vehicle, type of vehicle, driving environment, and other factors.

For example, although described with respect to an accelerator pedal, it is to be understood that an accelerator pedal is merely one type of accelerator interface which may be used. Although pedals are common in many types of automotive vehicles, grips or handles are other types of accelerator interfaces which may be used. Such accelerator interfaces may be present in vehicles such as motorcycles or specialty, industrial, or agricultural vehicles. In addition, where the vehicle is autonomous or semi-autonomous, the accelerator interface may be in the form of a machine interface such as may be implemented in hardware and/or software to control acceleration autonomously.

As described herein, an electronic device which includes a processor, microcontroller, integrated circuit, or other type of circuitry may be used to implement the dynamic regenerative braking. The electronic device may be a pre-existing device or system within the vehicle which is programmed to include the dynamic regenerative braking functionality. For example, the electronic device may be a part of a crash avoidance system of the vehicle. Thus, the functionality of a vehicle which already has regenerative braking and a crash avoidance system may be enhanced with the present methodology. Thus, the methodology and system described herein may be used to increase the safety of the vehicle. Moreover, the presence of appropriate safety features may be an important criteria for vehicle purchasers when making a purchasing decision as to which vehicle to buy and thus having dynamic regenerative braking features may result in increased vehicle sales, and/or the ability to sell the vehicles at higher prices.

It should also be understood that any number of existing vehicle systems may be used in sensing one or more parameters associated with a driving environment of the vehicle. Such systems may include vision systems such as those previously described which may use LIDAR, RADAR, cameras, optical sensing, or any number of other type of sensing as is known or as may become known.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment or example.

The invention is not to be limited to the particular embodiments described herein. In particular, the invention contemplates numerous variations in the specific methodology used and structures provided as described herein. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes, or methods of the invention. It is understood that any other modifications, substitutions, and/or additions can be made, which are within the intended spirit and scope of the invention.

V. References

[1] G. Xu, W. Li, K. Xu, and Z. Song, "An intelligent regenerative braking strategy for electric vehicles," Energies, vol. 4, no. 9, pp. 1461-1477, 2011, doi: 10.3390/en4091461.

[2] P. Cocron, F. Bühler, T. Franke, I. Neumann, B. Dielmann, and J. F. Krems, "Energy recapture through deceleration-regenerative braking in electric vehicles from a user perspective," Ergonomics, vol. 56, no. 8, pp. 1203-1215 August 2013, doi: 10.1080/00140139.2013.803160.

[3] C. Mitropoulos-Rundus, C. Schwarz, and D. McGehee, "Benefits Estimation of Regenerative Braking versus Service Braking," Ergonomics, vol. 0, no. ja, pp. 1-21, March 2021, doi: 10.1080/00140139.2021.1908601.

[4] K. T. Chau, "21-Pure electric vehicles," in Alternative Fuels and Advanced Vehicle Technologies for Improved Environmental Performance, R. Folkson, Ed. Woodhead Publishing, 2014, pp. 655-684. doi: 10.1533/9780857097422.3.655.

[5] T. Inagaki and M. Itoh, "Human's Overtrust in and Overreliance on Advanced Driver Assistance Systems: A Theoretical Framework," Int. J. Veh. Technol., vol. 2013, pp. 1-8, 2013, doi: 10.1155/2013/951762.

[6] K. V. Sakhare, T. Tewari, and V. Vyas, "Review of Vehicle Detection Systems in Advanced Driver Assistant Systems," Arch. Comput. Methods Eng., vol. 27, no. 2, pp. 591-610, April 2020, doi: 10.1007/s11831-019-09321-3.

[7] A. Mukhtar, L. Xia, and T. B. Tang, "Vehicle Detection Techniques for Collision Avoidance Systems: A Review," IEEE Trans. Intell. Transp. Syst., vol. 16, no. 5, pp. 2318-2338 October 2015, doi: 10.1109/TITS.2015.2409109.

[8] D. Biswas, H. Su, C. Wang, and A. Stevanovic, "Speed estimation of multiple moving objects from a moving UAV platform," ISPRS Int. J. Geo-Inf., vol. 8, no. 6, pp. 259-, 2019, doi: 10.3390/ijgi8060259.

[9] S. Y. Chang Zi-ting, "Vehicle Speed Measurement Method Based on Binocular Vision," Ji Suan Ji Ke Xue, vol. 48, no. 9, pp. 135-139, 2021, doi: 10.11896/jsjkx.201000047.

[10] W. Czajewski and M. Iwanowski, "Vision-Based Vehicle Speed Measurement Method," September 2010, vol. 6374, pp. 308-315. doi: 10.1007/978-3-642-15910-7_35.

[11] L. Yang, M. Li, X. Song, Z. Xiong, C. Hou, and B. Qu, "Vehicle Speed Measurement Based on Binocular Stereovision System," IEEE Access, vol. 7, pp. 106628-106641, 2019, doi: 10.1109/ACCESS.2019.2932120.

[12] MathWorks Student Competitions Team, "MATLAB and Simulink Racing Lounge: Vehicle Modeling." GitHub, 2021. [Online]. Available: https://github.com/mathworks/vehicle-modeling/releases/tag/v4.1.1

[13] C. Mitropoulos-Rundus, C. Schwarz, and D. McGehee, "Benefits Estimation of Regenerative Braking versus Service Braking," Ergonomics, vol. 0, no. ja, pp. 1-21, March 2021, doi: 10.1080/00140139.2021.1908601.

[14] S. Konz, N. Wadhera, S. Sathaye, and S. Chawla, "Human Factors Considerations for a Combined Brake-Accelerator Pedal," Ergonomics, vol. 14, no. 2, pp. 279-292, 1971, doi: 10.1080/00140137108931245.

[15] G. K. Poock, A. E. West, T. J. Toben, and J. P. T. Sullivan, "A Combined Accelerator-Brake Pedal," Ergonomics, vol. 16, no. 6, pp. 845-848, 1973, doi: 10.1080/00140137308924575.

[16] F. Sugimoto et al., "Effects of one-pedal automobile operation on the driver's emotional state and cognitive workload," Appl. Ergon., vol. 88, pp. 103179-103179, 2020, doi: 10.1016/j.apergo.2020.103179.

[17] Z. Gao, T. Sun, M. Hassan, and L. Wang, "Design of vehicle automatic braking systems considering drivers' braking characteristics," Int. J. Perform. Eng., vol. 15, no. 9, pp. 2338-2345, 2019, doi: 10.23940/ijpe. 19.09.p6.23382345.

[18] M. M. Minderhoud and P. H. L. Bovy, "Extended time-to-collision measures for road traffic safety assessment," Accid. Anal. Prev., vol. 33, no. 1, pp. 89-97, January 2001, doi: 10.1016/S0001-4575(00)00019-1.

[19] S. W. Smith, The scientist and engineer's guide to digital signal processing/by Steven W. Smith., First edition. San Diego, Calif.: California Technical Pub, 1997.

[20] M. Massot Campos, D. Montesinos i Miracle, J. Bergas Jané, and A. Rufer, "Multilevel modular DC/DC converter for regenerative braking using supercapacitors," April 2020, Accessed: Apr. 15, 2020. [Online]. Available: http://dspace.uib.es/xmlui/handle/11201/151887

[21] X. Hou, J. Zhang, Z. Zhang, and he Chengkun, "Analysis of Active Collision Avoidance Performance Based on Cooperative Regenerative Auxiliary Braking System," Nov. 2019. doi: 10.4271/2019-01-5027.

What is claimed:

1. A method for dynamic regenerating braking of a vehicle, the method comprising steps of:

sensing one or more parameters associated with a driving environment of the vehicle, the one or more parameters being indicative of a potential collision with a detected object in the driving environment;

determining, by an electronic device, a dynamic regenerative braking level based on the one or more parameters;

upon release of an accelerator interface, controlling by the electronic device application of regenerative braking at the dynamic regenerative braking level during a period between release of the accelerator interface and initiation of braking; and resetting the dynamic regenerative braking level by the electronic device when the accelerator interface is re-engaged.

2. The method of claim 1 wherein the accelerator interface comprises at least one of an accelerator pedal, a throttle grip, and a machine interface.

3. The method of claim 1 wherein the accelerator interface comprises an accelerator pedal and wherein the accelerator pedal is re-engaged when a vehicle operator applies pressure to the accelerator pedal.

4. The method of claim 1 wherein the sensing the one or more parameters associated with the driving environment is performed using a vision system.

5. The method of claim 1 wherein the one or more parameters associated with the driving environment of the vehicle are associated with the driving environment in a forward direction of the vehicle, the vehicle traveling in the forward direction.

6. The method of claim 1 wherein the adjusting the dynamic regenerative braking level comprises adjusting the dynamic regenerative braking level a plurality of times prior to initiation of the braking.

7. The method of claim 1 wherein the electronic device is associated with a crash avoidance system of the vehicle.

8. A crash avoidance system of a vehicle configured for performing the steps of claim 1.

9. A vehicle comprising a crash avoidance system configured for performing the steps of claim 1.

10. The vehicle of claim 9 wherein the vehicle is an autonomous vehicle.

11. The method of claim 1 wherein the one or more parameters include a distance between the vehicle and the detected object and a relative speed between the vehicle and the detected object.

12. The method of claim 11 wherein the electronic device determines the dynamic regenerative braking level by calculating a time-to-collision based on the distance and relative speed and deriving a required deceleration from the time-to-collision.

13. The method of claim 1 wherein the dynamic regenerative braking level is selected from a plurality of predetermined regenerative braking levels, each predetermined regenerative braking level corresponding to a characterized deceleration rate.

14. The method of claim 1 wherein the electronic device continuously updates the dynamic regenerative braking level based on recalculated values of the one or more parameters while the vehicle is decelerating under regenerative braking.

15. The method of claim 1 wherein the detected object comprises at least one of a lead vehicle, a stopped vehicle, a pedestrian, or a stationary obstacle.

16. A system for dynamically regenerating braking of a vehicle, the system comprising:

a plurality of sensors for sensing one or more parameters associated with a driving environment of the vehicle, the one or more parameters being indicative of a potential collision with a detected object in the driving environment; and an electronic device in operative communication with the plurality of sensors, the electronic device configured to determine a dynamic regenerative braking level based on the one or more parameters, upon release of an accelerator interface control application of regenerative braking at the dynamic regenerative braking level during a period between release of the accelerator interface and initiation of braking, and further configured to reset the dynamic regenerative braking level when the accelerator interface is re-engaged.

17. The system of claim 16 wherein the electronic device is further configured for controlling applying of regenerative braking at the dynamic regenerative braking level prior to resetting the dynamic regenerative braking level.

18. The system of claim 16 wherein the plurality of sensors include sensors associated with a vision system.

19. The system of claim 16 wherein the one or more parameters include a distance between the vehicle and the detected object and a relative speed between the vehicle and the detected object, and the electronic device is further configured to calculate a time-to-collision based on the distance and the relative speed.

20. A method for dynamic regenerative braking of a vehicle operated by a vehicle operator, the method comprising steps of:

sensing one or more parameters associated with a driving environment of the vehicle, the one or more parameters including parameters determined using a vision system of a vehicle position positioned to capture the driving environment in a forward direction, the one or more parameters being indicative of a potential collision with a detected object in the driving environment;

determining by an electronic device, a dynamic regenerative braking level based on the one or more parameters;

upon releases of an accelerator interface, controlling by the electronic device application of regenerative braking at the dynamic regenerative braking level during a period between release of the accelerator interface and engagement of a brake interface by the vehicle operator; and resetting the dynamic regenerative braking level by the electronic device when the vehicle operator applies pressure to the accelerator interface.

21. The method of claim 20 wherein the accelerator interface comprises an accelerator pedal.

* * * * *